US010997186B1

(12) United States Patent
Dub et al.

(10) Patent No.: US 10,997,186 B1
(45) Date of Patent: *May 4, 2021

(54) SYSTEM AND METHOD FOR AUTOMATIC DOCUMENT MANAGEMENT

(71) Applicant: Dub Software Group, Inc., Hartsdale, NY (US)

(72) Inventors: Eitan Dub, Hartsdale, NY (US); Adam O. Dub, Hartsdale, NY (US); Alfredo J. Miro, Bronx, NY (US)

(73) Assignee: Autofile Inc., Hartsdale, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/272,061

(22) Filed: Feb. 11, 2019

Related U.S. Application Data

(63) Continuation of application No. 14/673,207, filed on Mar. 30, 2015, now Pat. No. 10,204,143, which is a continuation of application No. 13/667,030, filed on Nov. 2, 2012, now Pat. No. 8,996,350.

(60) Provisional application No. 61/554,554, filed on Nov. 2, 2011.

(51) Int. Cl.
| | |
|---|---|
| G06F 16/58 | (2019.01) |
| G06F 16/2457 | (2019.01) |
| G06F 16/35 | (2019.01) |
| G06F 16/93 | (2019.01) |
| G06F 16/28 | (2019.01) |

(52) U.S. Cl.
CPC ...... *G06F 16/24578* (2019.01); *G06F 16/285* (2019.01); *G06F 16/35* (2019.01); *G06F 16/353* (2019.01); *G06F 16/93* (2019.01)

(58) Field of Classification Search
CPC .................................................. G06F 16/5846
USPC ......................... 707/640, 803, 804; 382/181
See application file for complete search history.

(56) References Cited

U.S. PATENT DOCUMENTS

| | | | | |
|---|---|---|---|---|
| 5,546,474 A | * | 8/1996 | Zuniga | G06K 9/00456 382/176 |
| 5,558,232 A | * | 9/1996 | Stevens | G06K 9/033 209/584 |
| 5,875,263 A | * | 2/1999 | Froessl | G06F 16/40 382/181 |

* cited by examiner

*Primary Examiner* — Baoquoc N To
(74) *Attorney, Agent, or Firm* — Hoffberg & Associates; Steven M. Hoffberg

(57) ABSTRACT

A system for managing documents, comprising: interfaces to a user interface, proving an application programming interface, a database of document images, a remote server, configured to communicate a text representation of the document from the optical character recognition engine to the report server, and to receive from the remote server a classification of the document; and logic configured to receive commands from the user interface, and to apply the classifications received from the remote server to the document images through the interface to the database. A corresponding method is also provided.

20 Claims, 3 Drawing Sheets

SYSTEM AND METHOD FOR AUTOMATIC DOCUMENT MANAGEMENT

CROSS REFERENCE TO RELATED APPLICATION

The present application is a Continuation of U.S. patent application Ser. No. 14/673,207, filed Mar. 30, 2015, now U.S. Pat. No. 10,204,143, issued Feb. 12, 2019, which is a Continuation of U.S. patent application Ser. No. 13/667,030, filed Nov. 2, 2012, now U.S. Pat. No. 8,996,350, issued Mar. 31, 2015, which is a non-provisional of U.S. Provisional Patent Application No. 61/554,554, filed Nov. 2, 2011, the entirety of which are expressly incorporated herein by reference.

BACKGROUND

Description of the Related Art

Classification of textual documents denotes assigning an unknown document to one of predefined classes. This is a straightforward concept from pattern recognition or from supervised machine learning. It implies the existence of a labeled training data set, a way to represent the documents, and a statistical classifier trained using the chosen representation of the training set. See, K Torkkola, "Discriminative features for text document classification", in Pattern Analysis & Applications, Springer (2004).

Linear Discriminant Analysis (LDA) may be applied to document classification, when vector space document representations are employed. LDA is a well-known method in statistical pattern recognition literature. Its aim is to learn a discriminative transformation matrix from the original high-dimensional space to a desired dimensionality [11]. The idea is to project the documents into a low dimensional space in which the classes are well separated. This can also be viewed as extracting features that only carry information pertinent to the classification task.

A known prior technique provides a vectorial text document representation based on the so called bag-of-words approach, in which each document is essentially represented as a histogram of terms, or as a function of the histogram. One straightforward function is normalization: the histograms are divided by the number of terms of the document to account for different document lengths. Terms (words) that occur in every document obviously do not convey much useful information for classification. Same applies to rare terms that are found only in a few documents. These, as well as common stop words, are usually filtered out of the corpus. Furthermore, the words may be stemmed. These operations leave a term dictionary that can range in size from thousands to tens of thousands. Correspondingly, this is the dimension of the space in which documents now are represented as vectors. Although the dimension may be high, a characteristic of this representation is that the vectors are sparse. For many statistical pattern classification methods this dimensionality may be too high. Thus dimension reduction methods are called for. Two possibilities exist, either selecting a subset of the original features, or transforming the features (or combinations) into derivative features.

Optimal feature selection coupled with a pattern recognition system leads to a combinatorial problem since all combinations of available features need to be evaluated, by actually training and evaluating a classifier. This is called the wrapper configuration [21, 24]. Obviously the wrapper strategy does not allow learning of parametric feature transforms, such as linear projections, because all possible transforms cannot be enumerated. Another approach is to evaluate some criterion related to the final classification error that would reflect the "importance" of a feature or a number of features jointly. This is called the filter configuration in feature selection [21, 24]. An optimal criterion would normally reflect the classification error rate. Approximations to the Bayes error rate can be used, based on Bhattacharyya bound or an interclass divergence criterion. However, these joint criteria are usually accompanied by a parametric, such as Gaussian, estimation of the multivariate densities at hand [13, 29], and are characterized by heavy computational demands.

In document classification problems, the dominant approach has been sequential greedy selection using various different criteria [33, 4, 25]. This is dictated by the sheer dimensionality of the document-term representation. However, greedy algorithms based on sequential feature selection using any criterion are suboptimal because they fail to find a feature set that would jointly optimize the criterion. For example, two features might both be very highly ranked by the criterion, but they may carry the same exact information about class discrimination, and are thus redundant. Thus, feature selection through any joint criteria such as the actual classification error, leads to a combinatorial explosion in computation. For this very reason finding a transform to lower dimensions might be easier than selecting features, given an appropriate objective function.

One well known dimension reducing transform is the principal component analysis (PCA), also called Karhunen-Loeve transform. PCA seeks to optimally represent the data in a lower dimensional space in the mean squared error sense. The transform is derived from the eigenvectors corresponding to the largest eigenvalues of the covariance matrix of training data. In the information retrieval community this method has been named Latent Semantic Indexing (or LSI) [7]. The covariance matrix of data in PCA corresponds now to the document-term matrix multiplied by its transpose. Entries in the covariance matrix represent co-occurring terms in the documents. Eigenvectors of this matrix corresponding to the dominant eigenvalues are directions related to dominant combinations of terms occurring in the corpus. These dominant combinations can be called "topics" or "semantic concepts". A transform matrix constructed from these eigenvectors projects a document onto these "latent semantic concepts", and the new low dimensional representation consists of the magnitudes of these projections. The eigenanalysis can be computed efficiently by a sparse variant of singular value decomposition of the document-term matrix [7, 1]. LSI was introduced to improve precision/recall, and it is useful in various information retrieval tasks. However, it is not an optimal representation for classification. LSI/PCA is completely unsupervised, that is, it pays no attention to the class labels of the existing training data. LSI aims at optimal representation of the original data in the lower dimensional space in the mean squared error sense. This representation has nothing to do with the optimal discrimination of the document classes.

Independent component analysis (ICA) has also been proposed as a tool to find "interesting" projections of the data [12, 32, 20]. Girolami et al. maximize negentropy to find a subspace on which the data has the least Gaussian projection [12]. The criterion corresponds to finding a clustered structure in the data, and bears a close relationship to projection pursuit methods [10]. This appears to be a very useful tool revealing non-Gaussian structures in the data.

However, as PCA, the method is completely unsupervised with regard to the class labels of the data, and it is not able to enhance class separability.

Sammon mapping [28], multidimensional scaling (MDS) [22], and FastMap [9] are examples of further methods that map data points into a lower dimensional space trying to preserve the mutual distances in the original high-dimensional space. These methods pay no attention to class labels either, only to the goodness of the representation. Thus, supervised feature extraction schemes are called for.

Linear discriminant analysis (LDA) refers to two distinct but related methods. The first is classifier design. Given a number of variables as the data representation, each class is modeled as Gaussian (with a covariance matrix and a mean vector). Observations are now classified to the class of the nearest mean vector according to Mahalanobis distance. The decision surfaces between classes become linear if the classes have a shared covariance matrix. In this case the decision surfaces are called Fisher discriminants, and the procedure of constructing them is called Linear Discriminant Analysis [11, 2]. The second use of the term LDA refers to a discriminative feature transform that is optimal for certain cases [11]. The relation to LDA as a classifier design is that these eigenvectors span the same space as directions orthogonal to the decision surfaces of Fisher discriminants. One high barrier in applying LDA directly to document-term data is the computational complexity of the processing.

SUMMARY OF THE INVENTION

The present technology provides a supervised document classification algorithm, implemented by a programmable processor, which employs alphanumeric strings, typically extracted from documents, which begin and end along word boundaries. A string may be a single word or a plurality of words. As each new document is added to the library, the classifier algorithm is executed. If the classification is not deemed reliable, a user is prompted to manually classify the document, and the training data used to adaptively improve the algorithm. If the document fits well within the existing classes, it is automatically classified, and the algorithm updated based on the new document.

A determination of reliability of classification may be statistical; that is, if the strings and/or characteristics of the document occur commonly within a single classification, and uncommonly within documents having different classifications, then the classification according to that string or characteristic is deemed reliable, and an automated classification takes place. On the other hand, if none of the available strings and/or characteristics has significant probative power for any existing classification, then the user is prompted to classify the document, and the resulting classification is then populated with the characteristic strings and/or characteristics of the document. In some cases, users may accidentally or intentionally establish redundant document classifications. That is, the same document or substantially identical is sought to be classified in multiple classes. In that case, the system may prompt the user regarding the issue, or automatically generate an alias, which can then be used to handle the ambiguity. Indeed, the classification may be user-specific, such that each user may have a private or customized classification. In general, the classification will be objective and consistent across users, and the classification unambiguous, such that inconsistencies are resolved at the time the document is being entered.

A newly received document is scanned and optically character recognized (OCR). Documents from other sources may also be integrated, such as fax, email, word-processing format, and archive. The OCRed document is then parsed on word boundaries and then all of the single words and strings of words up to, for example, 256 characters, are then indexed. The strings may be processed to eliminate spaces and/or "stop" words. Indexed strings are then compared to lists, which provide exclusions of strings that are common. For example, the word "the" alone would likely not result in important classification power between different classes, and thus may be excluded from the analytics. Even if a string is present in many different classes, so long as it is not present in certain classes, it has distinctive power. On the other hand, if the string is unreliably present in any class, and unreliably absent in any class, then it has low distinctive power. Through string analysis, a statistical classification system may be implemented, with tunable rules. That is, if and when errors are encountered, the particular strings that caused the misclassification analyzed (e.g., by a person), and the rules altered to achieve the correct result. Therefore, this technique has at least this advantage over a purely statistical technique, and also might have superior performance and computational efficiency. It is noted that document structure or characteristics other that strings may also be treated similarly. That is, the characteristics of the document are coded in an ordered manner, and the codes compared to codes for other documents. This allows document formatting to serve as a basis for classification.

Typically, the algorithm proceeds without semantic analysis or processing, other than word boundaries, though it is also possible to employ known semantic techniques to supplement the basic classification task.

Because the classifier typically operates on strings that may include a plurality of words, the classifier has capability to readily classify forms and other structured document, which may have relatively unique features or sets of features, i.e., signatures or fingerprints, as compared to other forms or structured documents, or unstructured documents. In a trivial case, a form may have a unique form number provided on a page, which can readily be extracted and compared to the classification criteria. Because a plurality of features are typically available to discriminate between classes, the present technique would typically not misclassify a document that mentions a form identifier.

Thus, a single signature may be present in multiple classes of documents, and likewise, no single signature need be present in all examples of a single class. Again taking a trivial example, if a form identifier were missing from its normal place on a form, that would not preclude proper classification; however, if the deviations from the normal discriminants of the class is significant, a manual confirmation may be requested.

It has been found that for clean scanned and optical character recognized documents representing different electronic health record documents, a class of documents may be defined based on 3-4 examples, with reasonable reliability. Note that the technique typically operates on documents having an implicit structure to determine whether they reside within a respective class or are not reliably classified at all, and only in rarer instances is the classification competitive between different classes. If the classification system determines that the classification between various competing classes is unreliable, it will seek manual training, which will then provide additional training data for the respective task.

Another aspect of the technology provides a distributed architecture, such as a cloud computing architecture, for implementing the classification task. This provides at least two advantages. First, the classification may be performed based on data from a plurality of users, thus potentially reducing the individual burdens, and second, the classification processing task may be performed by hardware well suited to the task, which is statistically multiplexed between various users.

In order to provide this distributed approach, which may be a client-server or cloud architecture, a user typically acquires one or more new documents, which may be derived from an image scanner, the images then being analyzed by optical character recognition. The present technology does not require, and typically does not rely on zonal recognition of the documents, though document layout information need not be ignored. The document text, or extracted signatures, are then conveyed to the server. By transmitting only signatures, security risks are reduced. Indeed, it is possible to mask or eliminate, at the client side, various types of personal information, since such information may be unnecessary for the classification task. Therefore, the client system may employ a dictionary, and recognize proper nouns, personal identifiers, and the like. These may be substituted with a generic identifier or token, and provided within an extracted signature. Thus implemented, the communication to the server may be implemented without leaking sensitive information, in a scrubbing process that occurs independent of the classification.

In order to secure communications, strings may be compressed and encrypted, or encapsulated within an encrypted communications stream, such as SSL/TLS, or the like. In general, the strings may be padded to a uniform minimum size, and communicated to a server. The server may then search against an encrypted index, thus preserving privacy. This permits the server to operate outside of a firewall, with relatively low leakage of private information.

Once the document is classified at the server, the classification may be returned to the client. If the entire text of the document is conveyed to the server, then the server may return a completely processed document. The document may be scrubbed or tokenized at the client.

For example, if the document is a medical report, patient name, identifier(s), and other information may be replaced with alternate token strings, such as "NameA74E0B12", which convey the same document organization for classification purposes, but anonymize the document. After processing, the server classifies the document, and returns information about the structure of the document. For example, the client system may not distinguish between patient name, doctor name, and referring physician name. However, in the returned classification information, a template is provided which identifies a "role" or meaning of the respective tokens. The client system then reverses the tokenization, and may store the identified fields in a database, generally along with the full text of the document, which may be useful for unstructured searching or reclassification/adaptive classification updates. The server system may also retain a copy of the text (which may be scrubbed) for updating its algorithms.

Typically, the signatures normally employed are those which provide statistically reliable discriminative power. Other signatures which fail to improve performance may be dropped. However, when a new document which is statistically marginal for a reliable classification is encountered, the system may access previously classified documents, especially those associated with training data, to recalculate the appropriate signatures for use.

Because of the relative advantages of a distributed architecture over a self-contained system, an advantageous business model for monetization of the technology becomes apparent. That is, the system may operate on a subscription or resource usage basis, rather than a more traditional software license basis. Indeed, in some cases, the client software may be a browser, such as an HTML 5 compliant browser, operating directly or in conjunction with a local server to provide database and application support. Further, the client system may be a tablet or smartphone-type system (e.g., Apple iOS6, iOS5, Google Android 4.2, 4.1, Microsoft Windows 7 or 8), employing a camera, e.g., 8 megapixel CMOS, in the device as a document scanner.

Another advantage of the present architecture is that it may provide a hybrid architecture interfacing a proprietary document or record management system, such as traditional electronic health record software, with automated document capture and classification. Thus, the server or cloud may return data to the client as an XML file, which may then be received using an XML data import facility into the proprietary system. In this case, a user need not replace an existing system which does not provide support for document classification, and further provides a roadmap toward portability to new architectures, since the server or cloud system may maintain the XML files (in some cases in encrypted/secure form) for input into a successor system. The XML files, for example, contain the full text of the file (perhaps with scrubbing/anonymization/tokenization), the document classification, an identification of a structure template or the template itself, and extracted structures of the document identified as relevant fields.

In an embodiment, one or more documents are scanned and converted into one or more electronic files, such as to TIFF, PDF or other suitable format. The document(s) may be, thereafter, translated into text, such as by optical character recognition ("OCR") or other suitable way. In an embodiment, no "OCR rubberbanding" (as known in the art) is performed, which relies on performing OCR on a particular location in a plurality of documents where the same or similar kinds of information are believed to be. OCR rubberbanding may be useful for use with structured forms, which have a consistent layout, but believed by the inventors to be significantly less helpful for unstructured or semi-structured documents, in which information is provided in potentially inconsistent ways and places.

In accordance with an embodiment, documents are scanned and submitted to an information processor to be included in a "sample," and have not been identified or classified by the user or the system. A data entry display form may be provided to a user, to make selections and/or enter data to identify the type of document(s), i.e., to define a document type, including for future classification of documents of the same or similar document type.

In an embodiment, after the user has classified the document(s), instructions may be executed by an information processor that enable the processor to identify similar document types in the future without requiring a user to submit information, such as in a data entry display screen, to classify the document. In an embodiment, one or ore more words are identified in the document(s) that provide some representation of the document type. Referred herein to, generally, as a "phrase," the words are used at least partially for future automated classification of one or more documents. In an embodiment, a plurality of words in a phrase may be contiguous in the document(s), which may increase the accuracy of determining the document type.

In addition, a determination may be made that one or more phrases collectively represent a given document type. Referred herein to, generally, as a "fingerprint," the fingerprint(s) are associated with a respective document type and also used at least partially for future automated classification of one or more documents. A single fingerprint may include hundreds of phrases. Moreover, phrases may be further classified to have greater or lesser significance, for example, and assigned a weight value, such as to represent a relative likelihood that a document containing the phrase is of a particular type. In an embodiment, the size of the fingerprint may be assessed as having greater or lesser significance in connection with determining a document type. For example, a large-sized fingerprint (e.g., including many phrases) may be weighted more heavily than a small-sized fingerprint. Some words and/or phrases may be unique to a particular document type, and are particularly helpful during document type determination. Such words may be referred to herein, generally, as "unique phrases."

In an embodiment, a matching process may be performed that matches words in a document found in one or more phrases and/or one or more fingerprints. Moreover, a plurality of fingerprints may be referenced, for example, during a matching process, to determine a document type. In an embodiment, fingerprints and/or phrases are stored in one or more databases for future reference, such as for a document type identification process.

In an embodiment, a document type is based at least on a positive data analysis in which a high percentage matching of words in a document to words in one or more phrases and/or fingerprints is determined. The words in a document are searched for in one or more of a plurality of fingerprints that are stored in a database(s) and a determination of a percentage value representing successful matching may be calculated and used in a document type assessment process. In an embodiment, a set of fingerprints is defined as meeting at least a minimal threshold of acceptance and, accordingly, possibly representing a respective document type.

Occasionally during a process of determining a respective document's document type, two or more matching fingerprints are identified (e.g., based at least on a percentage of words that match the fingerprints) that represent different document types. For example, one fingerprint may represent a legal contract and another fingerprint may represent a legal memorandum. In such case, a further determination, e.g., a secondary selection process, may be made to identify the correct document type, for example, by selecting one of the fingerprints for identifying the document type. The secondary selection process may be based on several factors, such as by evaluating the percentage of matched words in the document with words in the respective fingerprints, as well as by evaluating relative weight values in the phrases and/or fingerprints and corresponding matching words in the document, including, for example, whether any unique phrases have been identified in the fingerprints and/or phrases. Moreover, a new fingerprint may be defined following this secondary selection process that represents a plurality of fingerprints used to represent a particular document type.

Thus, in the event that during a document type determination process more than one possible document type is identified for a given document, a secondary analysis may occur that evaluates, for example, the percentage of matched words in the document with words in one or more phrases and/or fingerprints, the relative sizes of the fingerprints and/or the existence of any unique phrase in the match.

Occasionally, a determination of a respective document type is not made successfully after the system evaluates the document, substantially as described above. In such case, one or more data entry display screens may be provided to a user to identify the document type. In an embodiment, one or more images of the respective document(s) is displayed to the user for the user to identify the documents. Such images may be provided in a form of one or more selectable watermarks, which improves the interface and ability for users to make selections, such as via graphical screen controls, that are not part of the documents, per se. A document that is not successfully identified by type following an automated process (e.g., substantially as described above) may be treated as a sample, and may be used for additional learning by the system for future document type analysis. A new fingerprint may be defined and that is based following the user's submission(s), which may be an aggregate of new information following the user's submission(s) with one or more previous fingerprints, or may be an entirely new fingerprint. Thus, when documents are received by an information processor, processed and, thereafter, misidentified or not identified, information is received from a user who identifies the document. The document is effectively treated as a new sample, such as described above, and usable for generating one or more new fingerprints.

In accordance with an embodiment and when no user intervention is required due to successful document type identification, additional procedures may be implemented to improve document type analysis and identification. For example, one or more fingerprints used to identify a particular document type may be evaluated for determining whether unnecessary or otherwise superfluous phrase(s) are included therein. The result of the evaluation may be that a new fingerprint is defined that is smaller (e.g., more lean) than the previous fingerprint, which may improve system performance (e.g., speed) without sacrificing accuracy. Alternatively, a fingerprint may be modified (without generating a new fingerprint), for example, by removing one or more phrases therefrom. Yet further alternatively, a new fingerprint may be defined (or a fingerprint may be modified) that includes new phrase(s) (e.g., is larger) in order to improve accuracy. By evaluating, modifying and/or creating fingerprints and/or phrases, even following successful document type identification, the systems and methods disclosed herein provide improved accuracy and performance.

Occasionally, documents are received by an information processor that have one or more imperfections that may impact negatively the OCR and/or document type identification processes. For example, documents may have blemishes (e.g., streaks from facsimile machines, coffee stains or other issues), may not be scanned in straight line orientation (e.g., be tilted to one side), or may have graphical artifacts (e.g., resulting from a low resolution and/or magnification). In such cases, a new fingerprint may be defined which has fewer phrases, even though such fingerprint may result in a potential lesser degree of accuracy. Although one fingerprint may be "weakened," e.g., may include fewer phrases, including, for example, unique phrases, other fingerprints and/or phrases will be relied upon to identify the document type and eliminate user intervention. In this way, a plurality of fingerprints, including one or more fingerprints that may have lesser strength than others, are referenced and relied upon to identify a particular document type. This may be further provided as a function of consistent application of such fingerprints after one or more respective documents are identified by the information processor as having some imperfection, such as described above.

Thus, and in accordance with the teachings herein, the present application includes systems and methods for scanning and/or using scanned documents, which may be structured or unstructured and/or semi-structured, recognizing the documents and generating and storing data captured therefrom for targets. In an embodiment, one or more features may be integrated in a sort of "engine" to facilitate task(s) that would otherwise require labor-intensive practices, such as by naming files, identifying content in scanned materials or the like.

In one embodiment, a user access a graphical user interface (e.g., a "front-end") to select one or more of a file folder or other location on a computing device, select files (e.g., TIFF, PDF or other suitable formatted files), and selects an option to perform analysis, such as shown and described herein. Processing may occur locally, e.g., on one or more computing devices located at the user's site and/or behind the user's firewall(s), or may occur remotely, such as on one or more computing devices accessible via a communication network and during a secure communication session. In an embodiment, SAS programs are implemented to provide statistical analysis, data management and other computing functionality. In addition, one or more SQL databases may be implemented for data storage and retrieval. Furthermore, programming routines may be implemented for normalizing data in accordance with SQL database structures, and for sending and receiving information to and from respective devices associated with the present application.

A preferred implementation provides a user interface component (UI), which communicates with a local server (C server), that is, a logical and/or physical system that has a high bandwidth, low latency communication path with the user interface, and which supports an application programming interface for communicating with the UI, as well as performing other functions. The C server, in turn communicates with a remote application server (A server), which provides certain functionality. In this case, the A server provides classification and indexing support for the C server, and indeed can support a plurality of C servers concurrently. Typically, there is only a single A server; however, the A server can be distributed and/or redundant. In some cases, multiple specialized A servers may be provided.

The A server maintains an index of classification characteristics of documents, and may be manually administered to improve classification accuracy and performance, and to address exceptions and persistent errors. This management function gains from centralization, because novel classification issues for each C server may not be novel for the A server, and sparse data from a plurality of C servers may be sufficient to form a reliable basis for classification.

It is noted that generally, the classification of a document is intrinsic, and the information leakage from one C server to another due to the A server and its processing is principally the fact that a document type is previously known. In many cases, this type of leakage does not present a problem. In cases where leakage is unacceptable, the A server may execute within the firewall of the C server, or remotely as a private or virtual private machine, and thus isolate the data and communications of the respective C server from other C servers.

In some cases, the document classification strings and/or documents are private, and therefore the A server must be private.

The client software is the primary user-interface software, and performs functions including but not limited to: (1) file intake management system; (2) sending work (e.g., documents, tasks) to local the C Server for processing; (3) manages document(s) and target data; (4) reviewing and filing document(s) auto-identified by the A Server; (5) correcting and identifying A-Server exceptions; (6) document and data searching facilities; (7) Printing and emailing (electronic communications) of document(s); and (8) system setup and definition(s). The client software may be browser-based, e.g., HTML5, but is preferably a native application executing directly under the operating system of the platform on which it resides. While the client software provides user interface functionality, it typically does not perform sophisticated processing of information, and communicates through a client software API with the C server. Communications terminating at the A server are typically conducted through the C server. However, the client software may include additional functionality that provides functions which need not pass through the C server. For example, file management, (generic) document browsing, email (IMAP, POPS, SMTP), word processing/messaging, etc., may be provided as separate and distinct functions.

"Work", which is part of the workflow handled by the system, includes but is not limited to, (1) scanning paper pages into image files; (2) intake of preexisting files resident on networked station(s) or server(s); (3) scheduling and pacing of bulk transfer of files from designated directories; and (4) importing of files and data from foreign software systems.

The C-Server is the client server, performs functions including but not limited to (1) communicating with the client software through the client software API; (2) hosting a repository for document and target information; (3) performing (or controlling) Optical Character Recognition (OCR) and other document processing tasks, such as translation, format extraction, remote lookup (e.g., extracting portions of the document for search through Internet search engines or other remote resources, spell checking and aliasing of words likely to be misspelled, etc.); (4) Management and synchronization of data exchanges with the A-Server; (5) interfacing with an Electronic Medical Records (EMR) system; (6) interfacing with other foreign software/database systems. The C server therefore provides the main logic and operational capabilities of the system, with the exception of document classification, and other functions which are offloaded from or controlled by the C server. Typically, the C server and A server are collaborative, and have a specialized communication protocol; however, it is possible to provide a generic C server API which allows different A servers and other servers and/or resources to communicate with the C server, and hence the client user interface software.

The C server may also implement certain firewall and data security rules. That is, in a controlled environment, the client user interface software may be the only user interface software available for the user, or at least the only interface to external (e.g., Internet) communications. Therefore, the C server is well placed to implement and enforce rules regarding data privacy, such as limiting external communications of private data, such as medical records, to communications conducted with the A server over a secure channel, such as virtual private network (VPN). These rules may, in turn, be centrally managed by the A server. The C server may also implement user authentication and verification, logging, and identity and/or role based access to information. In some cases, a user may have privileges to use the client user interface software and control the operation of the system, but insufficient privileges to view certain documents. Therefore, the C server may redirect some tasks requiring a higher or different privilege level to an appropriately privileged user. This, in turn, permits use of relatively unprivileged and perhaps less expensive labor for some tasks, and automatically invoking use of appropriately privileged users on an as-needed basis. This work-sharing protocol also permits monitoring by a supervisor or trainer. In some cases, the C server may automatically redact a document so that the remaining information is available to the user; in manty cases, the redacted document will contain sufficient information to permit completion of the task, so that elevation is not required.

The A sever or Automation Server (which permits operation in a "Software-as-a-Service" mode), performs functions including but not limited to: (1) Receiving single or batches of pages from the C Server; (2) derives document-type fingerprint(s) from manually identified document samples; (3) manages and synchronizes data exchanges with the C Servers; (4) applies fingerprint matching algorithm(s) to potentially identify document(s); (5) applies target matching algorithm(s) to potentially identify target(s) linked to each document; and (6) transmits results to the respective C Server. The A server may be managed by a super-user or administrator, and thus may support a special interface for those functions. Alternately, the super-user or administrator may have a direct interface to the underlying databases and logs, that does not require access through the A server.

The A server receives documents, and extracts "fingerprints" or characteristic features from the documents. These fingerprints are then matched to an index, using crisp and/or fuzzy (tolerant to small differences, typically on using statistical processing to determine a quality of match) matching, and the classification returned to the C server. The A server typically retains the source documents only for a short time, in order to facilitate management functions, but the A server is not typically intended as an archival storage facility (though this function may of course be implemented). Indeed, in some implementations, the fingerprints of the documents are extracted at the C server, and therefore the A server does not have access to the documents as a whole.

Assuming a comprehensive workflow involving the A server, the A server can implement various practice statistics and reporting functions. Thus, assuming all medical notes are presented to the A server, and the A server properly classifies these according to the required categories, the A server may be able to provide support for automated billing of patients or third party payors (TPP) in a clinical case setting. Likewise, the system could route requests for authorization where necessary to TPP. While similar functions might be implemented by the C server as well, the server provides an opportunity to centralize practice policies and communications rather than at a user level, and the A server given its higher level of management could better implement dynamically changing rules and policies of various TPPs. For example, if a TPP requires a new distinction be made changing the classifications of one or more document types, the A server may be modified to implement this change, without requiring update of all of the C servers. In some cases, the change can be implemented without full retaining (e.g., a rule implemented based on a word or phrase than can readily reclassify documents previously encountered), or may require retaining by presenting documents subject to the reclassification to users as they are encountered.

It is therefore an object to provide a system for managing documents, comprising: an interface to a user interface, providing an application programming interface; an interface to a database of document images having an index of semantic content of the documents in the database; at least one of an interface to an optical character recognition engine and an optical character recognition engine; an interface to a remote server, configured to communicate a representation of the document from the optical character recognition engine to the remote server, and to receive from the remote server a classification of the document; and logic configured to receive commands from the user interface, and to apply the classifications received from the remote server to the document images through the interface to the database.

It is also an object to provide a system for managing documents, comprising: an interface to a user interface, providing an application programming interface; an interface to a database of documents having an index of content of the documents in the database; at least one of an interface to document analysis engine and a document analysis engine which extracts content features from each respective document; an interface to a remote server, configured to communicate the extracted content features from the document analysis engine to the remote server, and to receive from the remote server a classification of the document in dependence on the extracted content features and a set of classification categories defined by a user; and logic configured to authenticate a user, receive commands from the user interface, to receive the user defined classification categories, and to apply the classifications received from the remote server to the documents through the interface to the database.

The logic may further define a task for execution by the user interface, selectively dependent on a content of a respective document.

The logic may be further configured to access a document archive for reprocessing of a set of documents in the document archive according to an updated classification.

The logic may be further configured to access a document archive for processing a set of documents in the document archive according to a set of classifications.

The remote server may persistently store a set of classification characteristics, and the logic may be further configured to reset the persistently stored set of classification characteristics.

Each document may have at least one target, and the interface to the remote server may be configured to receive from the remote server the at least one target for the document.

The optical character recognition engine may operate on set of images prior to adding a batch of the images and their respective optical recognition engine output to the database.

The document analysis engine may comprise an optical character recognition engine. The document analysis engine may operate on a set of documents or portions of documents prior to adding a batch of the documents or portions of the documents to the database.

Each document may have a provenance representing a source batch of page images and a place within a sequence of the batch of page images, wherein the provenance is stored in the database in association with a respective document.

Each document may have a provenance representing a source of the document and an association of the document with documents having the same source, wherein the provenance is stored in the database in association with a respective document.

A further objet provides a method for managing documents, comprising: providing an application programming interface to a user interface system; providing a database of documents having an index of content of the documents in the database; providing an interface to receive content features from a document analysis engine from each respective document; communicating the extracted content features from the document analysis engine to a remote server; receiving from the remote server a classification of the document in dependence on the extracted content features and a set of classification categories defined by a user; authenticating a user; receiving commands from the user interface; receiving the user defined classification categories; and applying the classifications received from the remote server to the documents through the interface to the database.

The method may further comprise accessing a document archive for at least one of: reprocessing of a set of documents in the document archive according to an updated classification; and processing a set of documents in the document archive according to a set of classifications.

Each document may have at least one target, the method further comprising receiving from the remote server the at least one target for the document.

BRIEF DESCRIPTION OF THE DRAWINGS

FIG. 2 shows a schematic diagram of a preferred system architecture; and.

DETAILED DESCRIPTION OF THE PREFERRED EMBODIMENTS

Figure 1:
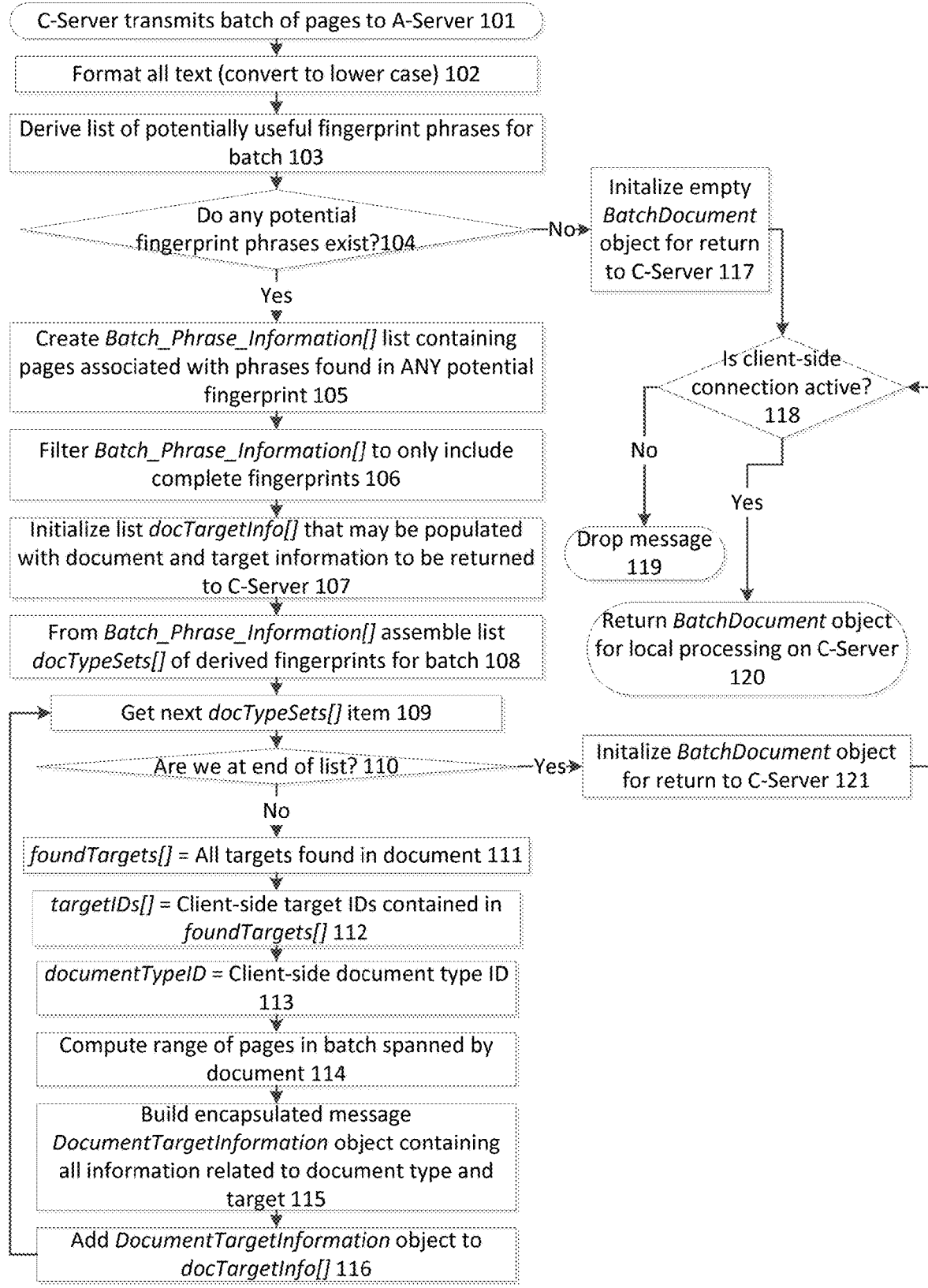
FIG. 1 shows a flowchart according to an embodiment of the technology.

A batch is a grouping of pages, that may be: (1) Unsorted; (2) Untagged; and/or (3) Unseparated. Page is a collection of words, including all alphanumeric sequences. A document is a span of consecutive and/or interrelated pages. A Document-Type is a user assigned name or other persistent classification for a set of similar documents. A Target is a person, company, account, or subject/topic. A cabinet is a user configurable presentation of stored documents including but not limited to: (1) a hierarchical tree view; (2) user defined nodes/folders; or (3) a user defined document captions/titles. A fingerprint phrase or word is a unique collection of phrases found to be common in a set of similar documents. Phrase is a collection of contiguous words. A word is a collection of contiguous alphanumeric characters.

A typical user input station includes a document scanner, which for example, scans pages and forwards TIFF (tagged image file format) or PDF (Adobe page description format) files by FTP to a networked FTP server. In the scanner, pages/batches are stacked on a scanner's input tray. According to a preferred embodiment, there is no need for sorting by document type and document target(s) such as patients, customers, clients, etc. Blank separator pages and identifying barcodes are also not needed. Of course, these may be employed.

Using the "Add" transaction, users browse to directories consisting of TIFF/PDF images using the client user interface software. Specific files are selected for transfer into the system, or a directory can be selected for a batched transfer of its subordinate files. The process can be pre-scheduled to operate at specific hours when high network traffic is not detrimental to normal office work. Additional tools are available to pace high-volume transfers.

The initial process at the C Server queues batches for OCR processing, which is hosted on the C Server. The user can transaction monitor progress of queued jobs through the client user interface software. At the end of OCR processing, text data representing each page is sent over a private network, VPN, or the web to the "SaaS Operations Center", i.e., the A server discussed above.

The automatically performed process at the A Server provides simple interfaces for users to name a few initial samples of each Document Type. No additional interactions are typically required between users and the automation process, except to override automated decisions on rare occasions and when needing to refine particular Document Type definitions. The automation process itself is self-tending and adaptive in both its thresholds and sensitivity to most changes experienced with documents. Such changes might include (1) updates and new versions of existing documents, (2) physical differences routinely experienced in unstructured documents, both in content and number-of-pages, and (3) anomalous behavior of scanning equipment and OCR software.

The system does not typically utilize zone-OCR techniques, nor does it require the presence of separator pages. The automation algorithms utilize a stochastic process of iterative data-reduction, to build each page's candidacy for matching a known Document Type. Successive pages are assembled into coherent potential documents that also satisfy first and last-page requirements. Sliding computational certainty thresholds are applied to each candidate document with iterative comparison to all others. Finally, documents are tagged with their Document Type identities.

Each identified document undergoes a deterministic process of locating data that can be verified as known target(s) such as: client(s), customer(s), account(s), company, patient(s), responsible physician(s), etc. The process is iterated in-order to locate multiple targets that may belong to a variety of target-categories. Each document is tagged with its appropriate target(s).

The A Server retains in its Universal Document Library (UDL) copies of Document Type models established at various C Server sites, filtering out non-unique duplications. As the UDL grows, the odds increase dramatically for widely used documents to be fully recognized upon the processing of their very first sample.

Messages composed of full or partial identities for assembled and tagged documents are sent back to the C Server for further processing. Unidentified pages are reported as 'unknown' in the returned data.

The A Server tracks the performance of its own automation processes as well as incidents of user overrides. This data is used to refine its automation algorithms, as well as to advise users about incidents of inappropriate identity assignments.

After the A server returns messages to the C server, in full EDM installations, batches previously sent for A server automation processing are reactivated once their identities are returned from the A Server. Processed batches are presented to users, along with batch statistics. Thus, the message from the A server recalls a context at the C server. Pages that were successfully assembled into documents are viewable by users, along with their Document Types and filing destinations (targets), aided by status flags and color indicators. High confidence Document Types may be auto-filed if they were administratively selected for Unattended Filing. They will exhibit a blue "FILED" status indicator. Those presented for user review/approval will show a "COMPLETE" status in green. Documents requiring the user intervention to assign their Document Types and/or Target(s) will display in orange. Unidentified pages will be colored red. They are assembled into documents and identified by users. The manual assembly and identification may be due to (1) potential document was not yet "seen" on the system, (2) the samples processed by the A Server are insufficient for reliable automation, and (3) either the original document was defective, or the OCR process failed to yield sufficient and unambiguous data. For all manually identified documents, and for those where users chose to override the automation process with their own definitions, the corresponding pages are automatically resubmitted to the A Server for evaluation and continued "learning" of the indicated Document Type.

Alternately, processing may be resumed at the C Server, which is in this case acting as a front-end interface to an EMR or a separate EDM System, and the processing steps specified above in the full EDM system installation apply, except for the physical document filing process. Instead of filing under the C Server control, the system will deliver to the associated EMR or external EDM system, all processed images and corresponding identifying data. The receiving system will utilize the images and data to support its own filing and access needs.

The C server may interact with an electronic medical record (EMR) system, and index documents from the EMR, and/or enter documents into the EMR system, e.g., for archiving. Thus, for example, copies of images (lab tests, radiology reports, etc.) and self-generated documents (provider notes, letters, prescriptions, etc.) are sent from an EMR system to the present system for identification and filing.

FIG. 1 shows flowchart of a method according to the present technology. The C-server transmits a batch of pages to the communications between the A-server 101. The text is formatted, e.g., to all lower case 102. More generally, the OCRed text is normalized to a standard format that permits efficient comparisons. A list of potentially useful fingerprint phrases is derived for the batch 103. If the fingerprint phrases exist 104, then a list is created of pages with phrases found in any potential fingerprint 105. The list is then filtered to include only complete fingerprints 106. A list is then initialized to be populated with documents and target information to be returned to the C server 107. The list is then assembled of derived fingerprints for the batch 108. The next batch is then retrieved 109. A test is performed to see if the end of the list is reached 110. If so, a variable is set of all targets found in the document 111. If not, a batch document object is initialized for return to the C server 121. A variable is also set indicating Client-side target identifications contained in the targets 112, and for client-side document type identifications 113. The range of pages in the batch spanned by the document is then computed 114. An encapsulated message is built, representing an object containing all information related to document type and target 115. The information is then added to the document Target information 116.

If no potential fingerprint phrases exist 104, then an empty batch document object is initialized for return to the C server 117. If the C-server side connection is not active 118, the message is dropped 119, otherwise the batch document object is communicated back to the C server for local processing 120.

Figure 2:
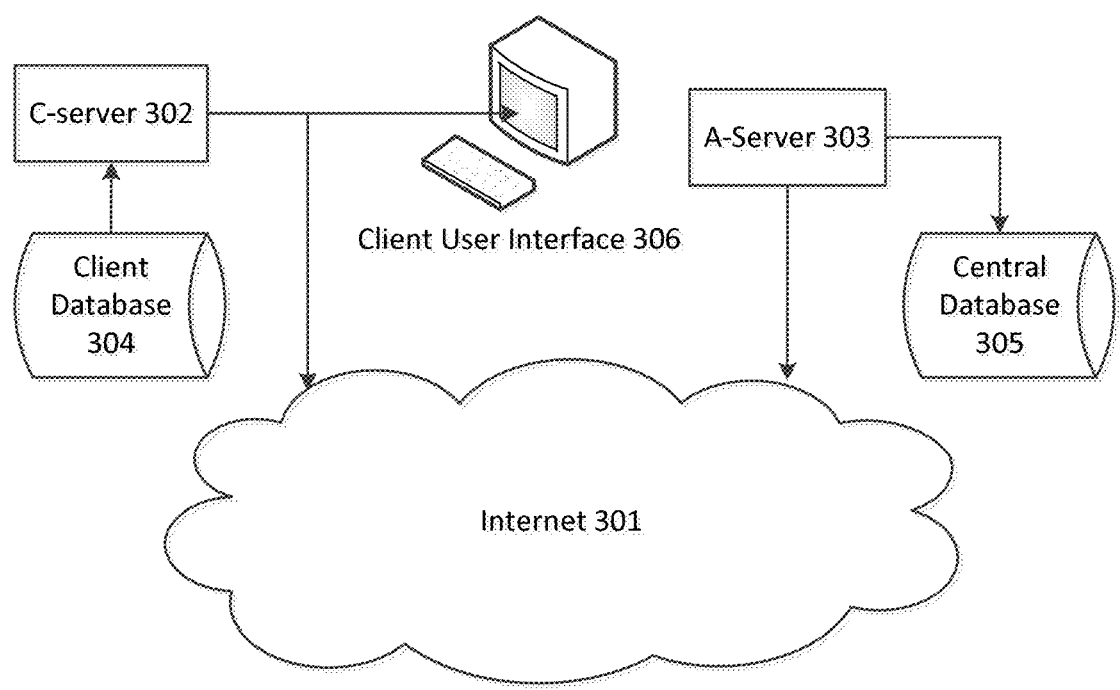

FIG. 2 shows a schematic diagram of a preferred system architecture, in which a client user interface 306 communicates with a C server 302 having a client database 304, which communicate with the Internet 301. Through the Internet 301, the C server 302 communicates with an A server 303, which has associated a central database 305.

The user interface is provided is, for example, a native Windows 7 compliant application (using the dot net (.NET) platform, windows communication foundation (WCF), windows presentation foundation (WPF)). The user interface provides a set of windows, for example, an intake screen, which monitors incoming documents or batches of documents, and indicates its progress though automated tasks, such as the classification.

Another window provided is the sender window, which, for example, allows the user to control sending documents of any format, to the C server for preprocessing (image deskewing, despeckling, other image enhancement) as might be necessary, forming a batch from multiple documents of the same or different document type. The sender also provides a preview function to permit the user to view the document(s) to be sent to the C server, and also provides ability to pace and schedule submissions to the C server, to thus permit administration of workloads and workflows.

The sender window can send files to user-specific or function specific designated data zones, which can be, for example, an indication of security status, privacy flags, data partitioning, workflow delineation, etc.

The client user interface software may provide a generic communication function for interaction with other systems, and which may include both input and output functions (controlled through a window) that permits communication of data with external processes. This function is managed by the client user interface software, but implemented by the C server, typically without having data pass through the user interface component, in such as TCP/IP communications, XML, ODBC, SOAP, and RPC. On the other hand, in some cases, communication can be to or through the client user interface software, for example with a local file system, USB drive or DVD-R, or using OLE, COM or other data feeds.

One task that may be desired is migrating archival or external databases into the C server database. A function may be provided in the sender to access these documents, and present these to the C server. Alternately, the client software may provide a configuration file or command to the C server for automated processing without requiring these documents to pass through the client software. In either case, the C server will generally give preference to processing new documents from the sender, and not to the external workflows.

The sender provides an important but optional functionality for the client software, and may be separately licensed and/or enabled. The client software may thus be usable in a data search and retrieval-only mode or a create and consume mode.

The C server can directly synchronize with another system to acquire documents input through the other system. The client user interface software is still used to classify documents, to search and retrieve documents, to otherwise interact with the A server, and to provide ancillary functionality. The client software in some cases can act as an add-on or add-in to another document management system. The interaction may be tightly coupled, or non-cooperative.

In some cases, documents are placed in a directory structure or other simple database (e.g., an email-type archive) by a separate document management system. The client user interface software or C server can monitor this directory structure or simple database to concurrently input these new documents into the C server database.

Further, a window may be provided for pending user intervention, i.e., messages or tasks that require the user to provide input to permit completion of processing. The pending window shows jobs that require confirmation before filing, or are incomplete or unidentifiable from the automation process of the server. Typically, the operation of the A server is not in real time with respect to the user interface software, so the pending jobs are delayed with respect to original user inputs for those jobs.

A window showing complete jobs representing documents or batches of documents that are completely filed, and are thus available for search and retrieval is also provided.

This window, and other windows within the client user interface software, provides an ability for a user to review historical information such as jobs submitted and/or completed within a given date range.

The intake monitoring (which encompasses the sender), pending, and complete processes are preferably subject to data zone partitioning, and thus may be separately filterable and controllable on that basis.

A view window is provided, which provides a method of presenting a directory or group of documents, representing a targeting of documents, filtered based on target categories. These target categories are user selectable, and thus provide a convenient means for interacting with the database, providing instant directed search and document retrieval. The view window provides an ability to preformat certain "cabinet" views based on user defined criteria.

Document views may be represented in a strip of thumbnails presented as a scrollable transparent overlay over a larger selected full page view, to facilitate user navigation in a group of pages. This may be implemented using the Windows aero, or in an Apple Mountain Lion interface or the like.

A search window is provided to manage search and retrieval of documents from the C server database. The search window provides full and complex search facilities, including logical (Boolean), key phrase and full text searches, field range, etc. The search window may be used for detailed data analysis, for example in a medical information database, to extract information on patients, medical conditions, and productivity. The user may save a formulated search for future re-execution or to later retrieve the same results. Another function is a subsearch of a defined document set defined by another search or other document set definition. Various document sets may be named, that is, the limiting criteria defined by a shorthand reference. A project may be defined as a set of retrieved documents, which for example, have a common subject.

The client user interface software also provides functionality for administration of the C server, for example, target categories, target subcategories, document types, users, security considerations, C server communications.

The system serves as a user interface for document management, and therefore tends to be paper-intensive. Often, a user has a stack of papers which are in the process of being input into the system. In many cases, the user retains the paper stack until the documents are fully filed, and thus creates a hybrid paperless and paper intensive workflow. One aspect of the technology provides a virtual paper stack in which documents are maintained electronically or scanned, and then truncated. Instead of working with a stack of paper, the images are available to the user on a separate screen, in parallel with the document management functions. Preferably, the separate screen is a separate device, such as an iPad, Android or Windows 8 tablet, which can be positioned comfortably for the user to view and manipulate a graphic user interface. Because the user "swipes" the mages to flip pages, the virtual paper stack may be positioned flat, next to the user, rather than on a screen in front of the user. For example, a tablet computer may be controlled through a virtual screen driver interface as an extended desktop view, presenting the viewer window of the client user interface software. In order to provide greater efficiency, the tablet computer may also communicate directly with the C server, so that page views are directly drawn from the C server database, without communication through the client user interface software. This requires external synchronization of the client software and the virtual paper stack system.

The client user interface system may include email functionality to permit inflow and outflow of data through an email infrastructure. For example, one or more documents may be sent as an email attachment to an email message, where the email body, recipients and subject are defined by and stored within the C server. The email itself is formatted and sent by email client software on the client system, though the C server may also communicate directly with an email server system.

Email can be received directly by an email server that routes the email to particular accounts, which are associated with users or groups, and forwarded to an appropriate C server. The email typically comes from outside a client firewall from an E server (email server), and may communicate with the C server over an arbitrary TCP port using an encrypted protocol, for example using WCF.

Alternately, the C server itself may have an email address, and receive emails and their respective attachments directed to it. Further, a user may have an email account that is monitored for received documents, which are then automatically input into the C server or client user interface software.

In any case, the document or document image is then automatically processed by the C server, either without user intervention or after user authorization and initiation. The email message and header associated with the document are preferably stored in the C server database in association with the document received as an attachment.

Hardware Overview

Figure 3:
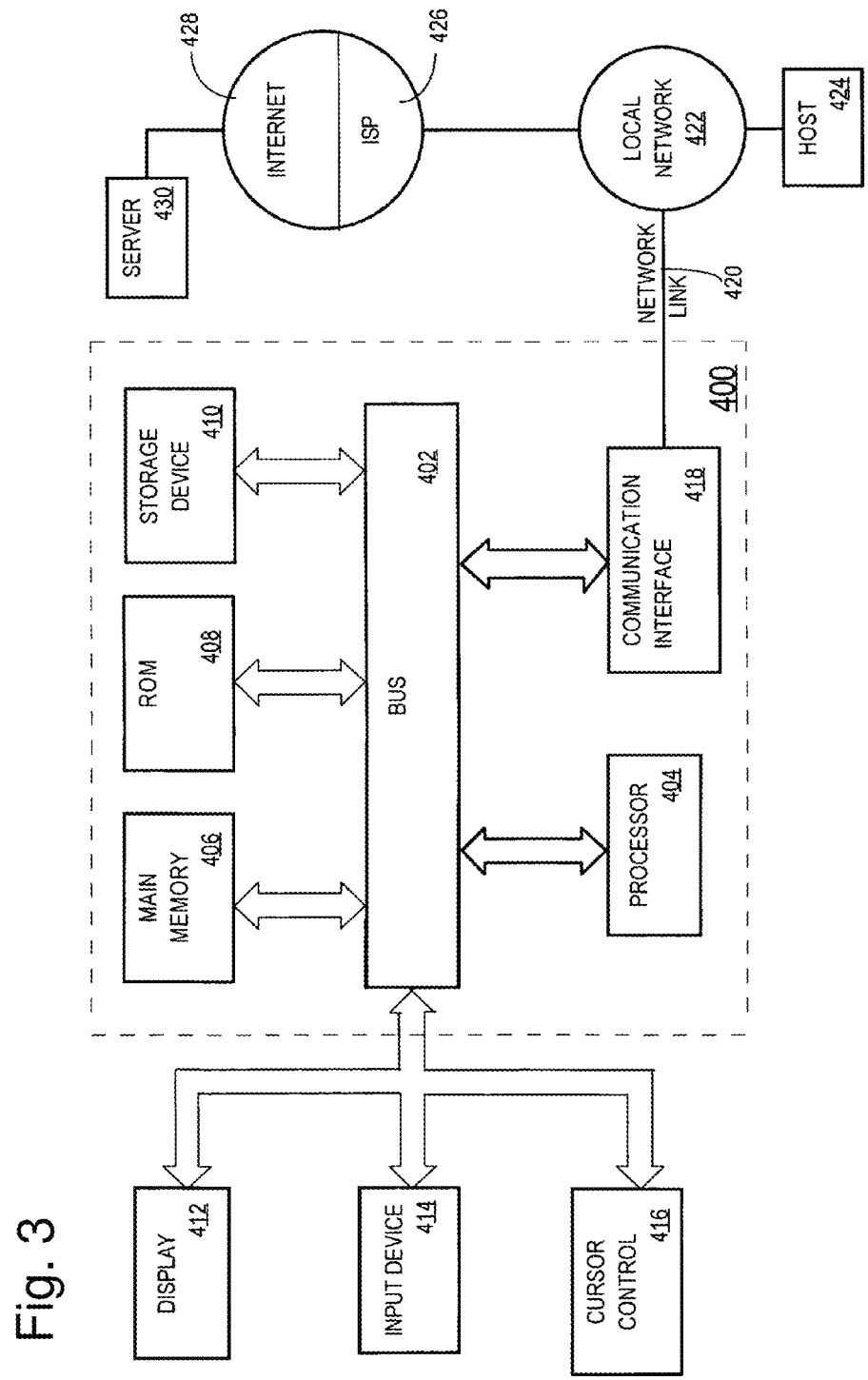
FIG. 3 shows a prior art representation of system, illustrative of components of, or usable with, the present system, and which can be used to implement the present method.

FIG. 3 (see U.S. Pat. No. 7,702,660, issued to Chan, expressly incorporated herein by reference), shows a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an Integrated Services Digital Network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In this description, several preferred embodiments were discussed. Persons skilled in the art will, undoubtedly, have other ideas as to how the systems and methods described herein may be used. It is understood that this broad invention is not limited to the embodiments discussed herein.

REFERENCES

Each of the following references (and associated appendices and/or supplements) is expressly incorporated herein by reference in its entirety:

U.S. Patent and Published Patent Application Nos.: U.S. Pat. Nos. 8,046,368; 6,668,256; 6,621,930; 6,446,061; 6,237,011; 6,009,442; 5,197,004; 4,965,763; 8,015,198; 8,014,591; 8,014,039; 8,000,530; 7,979,786; 7,969,598; 7,958,067; 7,949,728; 7,945,101; 7,941,446; 7,937,345; 7,933,453; 7,908,430; 7,877,409; 7,861,169; 7,853,693; 7,849,049; 7,849,048; 7,840,505; 7,818,165; 7,779,355; 7,774,363; 7,769,757; 7,764,830; 7,761,789; 7,761,591; 7,761,391; 7,757,162; 7,756,800; 7,747,655; 7,747,495; 7,743,347; 7,739,583; 7,734,554; 7,729,538; 7,716,240; 7,703,002; 7,672,940; 7,664,821; 7,660,819; 7,647,349; 7,640,037; 7,639,875; 7,602,971; 7,599,095; 7,596,755; 7,574,048; 7,570,816; 7,564,585; 7,561,734; 7,552,381; 7,539,671; 7,536,638; 7,529,408; 7,509,578; 7,509,569; 7,499,588; 7,495,795; 7,478,088; 7,475,335; 7,475,061; 7,450,760; 7,424,672; 7,386,442; 7,376,635; 7,370,059; 7,370,024; 7,331,725; 7,305,415; 7,299,405; 7,284,191; 7,275,159; 7,266,782; 7,263,671; 7,263,659; 7,257,589; 7,251,644; 7,239,424; 7,222,235; 7,215,436; 7,194,471; 7,185,008; 7,154,622; 7,149,957; 7,149,347; 7,142,728; 7,136,530; 7,133,862; 7,117,432; 7,039,864; 7,039,856; 7,024,408; 7,016,895; 7,003,516; 6,976,207; 6,976,053; 6,938,037; 6,928,425; 6,847,972; 6,826,724; 6,820,075; 6,801,902; 6,778,979; 6,732,090; 6,718,333; 6,658,151; 6,556,982; 6,553,365; 6,549,752; 6,542,635; 6,470,307; 6,442,555; 6,178,417; 6,175,844; 6,125,362; 6,122,399; 6,104,500; 6,044,375; 6,009,198; 5,991,709; 5,937,084; 5,909,510; 5,579,407; 5,511,148; 5,390,259; 5,168,565; 5,159,667; 4,748,678; 4,653,021; 20110258195;

20110258182; 20110258170; 20110258150; 20110255794; 20110255790; 20110255789; 20110255788; 20110255784; 20110255782; 20110249905; 20110196870; 20110192894; 20110188759; 20110184827; 20110178802; 20110153680; 20110153515; 20110145178; 20110137898; 20110106823; 20110103689; 20110103682; 20110099052; 20110093449; 20110078191; 20110078152; 20110055699; 20110032578; 20100312725; 20100306179; 20100306141; 20100262571; 20100250547; 20100235369; 20100235305; 20100223287; 20100169329; 20100169250; 20100153440; 20100142832; 20100135579; 20100094917; 20100057763; 20100054605; 20100034460; 20100033765; 20100033746; 20090313194; 20090244556; 20090228777; 20090228499; 20090204607; 20090192979; 20090187598; 20090157382; 20090154778; 20090152357; 20090138466; 20090138465; 20090119296; 20090116757; 20090116756; 20090116755; 20090116746; 20090116736; 20090110288; 20090089305; 20090087098; 20090080000; 20090067729; 20090063189; 20090034844; 20090028443; 20090024637; 20080301756; 20080273221; 20080273220; 20080272585; 20080232219; 20080212115; 20080172401; 20080147790; 20080147663; 20080147574; 20080117472; 20080112620; 20080109389; 20080097936; 20080091682; 20080086433; 20080086432; 20080086352; 20080071728; 20080069437; 20080066150; 20080066149; 20080065700; 20080062472; 20080060051; 20080059474; 20080037067; 20080005651; 20070253030; 20070242902; 20070237427; 20070237128; 20070217715; 20070217692; 20070217691; 20070201752; 20070180082; 20070179987; 20070169168; 20070157288; 20070157287; 20070156727; 20070156696; 20070156695; 20070156694; 20070156670; 20070156659; 20070143398; 20070136288; 20070118569; 20070118391; 20070100812; 20070038606; 20060282442; 20060264236; 20060262910; 20060251326; 20060229865; 20060218110; 20060190489; 20060149722; 20060104511; 20060095830; 20060085504; 20060080314; 20060028689; 20060023235; 20060017959; 20050259866; 20050251743; 20050246300; 20050223313; 20050125746; 20050125402; 20050091211; 20050022114; 20040205448; 20040186824; 20040042667; 20040024775; 20040015775; 20040013302; 20030182304; 20030069877; 20030061201; 20030061200; 20030061132; 20030046288; 20030033288; 20030033287; 20030002068; 20020150300; 20020102526; and 20010042085

[1] Michael W. Berry. Large scale singular value computations. International Journal of Supercomputer Applications, 6(1), 1992.
[2] Christopher M. Bishop. Neural Networks for Pattern Recognition. Oxford University Press, Oxford, N.Y., 1995.
[3] William Campbell, Kari Torkkola, and Sree Balakrishnan. Dimension reduction techniques for training polynomial networks. In Proceedings of the 17th International Conference on Machine Learning, pages 119-126, Stanford, Calif., USA, Jun. 29-Jul. 2 2000.
[4] Soumen Chakrabarti, Byron Dom, Rakesh Agrawal, and Prabhakar Raghavan. Scalable feature selection, classification and signature generation for organizing large text databases into hierarchical topic taxonomies. VLDB Journal: Very Large Data Bases, 7(3):163-178, 1998.
[5] Ronan Collobert and Samy Bengio. SVMTorch: Support Vector Machines for Large-Scale Regression Problems. Journal of Machine Learning Research, 1:143-160, 2001.
[6] Sanjoy Dasgupta. Experiments with random projection. In Proceedings of the 16th Conference on Uncertainty in Artificial Intelligence, pages 143-151, Stanford, Calif., Jun. 30-Jul. 3 2000.
[7] S. Deerwester, S. T. Dumais, T. K. Landauer, G. W. Furnas, and R. A. Harshman. Indexing by latent semantic analysis. Journal of the Society for Information Science, 41(6):391-407, 1990.
[8] I. S. Dhillon, D. S. Modha, and W. S. Spangler. Visualizing class structure of multidimensional data. In Proceedings of the 30th Symposium of on the Interface, Computing Science, And Statistics, pages 488-493, Minneapolis, Minn., USA, May 1998. Interface Foundation of North America.
[9] C. Faloutsos and K.-I. Lin. FastMap: A fast algorithm for indexing, data-mining and visualization of traditional and multimedia datasets. In Proceedings of the 1995 ACM SIGMOD International Conference on Management of Data, pages 163-174, San Jose, Calif., 1995.
[10] J. H. Friedman and J. W. Tukey. A projection pursuit algorithm for exploratory data analysis. IEEE Trans. on Computers, C-23:881, 1974.
[11] K. Fukunaga. Introduction to statistical pattern recognition (2nd edition). Academic Press, New York, 1990.
[12] Mark Girolami, Andrzej Cichocki, and Shun-Ichi Amari. A common neural network model for unsupervised exploratory data analysis and independent component analysis. IEEE Transactions on Neural Networks, 9(6):1495-1501, November 1998.
[13] Xuan Guorong, Chai Peiqi, and Wu Minhui. Bhattacharyya distance feature selection. In Proceedings of the 13th International Conference on Pattern Recognition, volume 2, pages 195-199. IEEE, 25-29 Aug. 1996.
[14] Eui-Hong (Sam) Han, George Karypis, and Vipin Kumar. Text categorization using weight adjusted k-nearest neighbor classification. In Proc. PAKDD, 2001.
[15] David Hull. Using statistical testing in the evaluation of retrieval performance. In Proc. of the 16th ACM/SIGIR Conference, pages 329-338, 1993.
[16] David Hull. Improving text retrieval for the routing problem using latent semantic indexing. In Proc. SIGIR'94, pages 282-291, Dublin, Ireland, Jul. 3-6 1994.
[17] Thorsten Joachims. Text categorization with support vector machines: Learning with many relevant features. In Claire N'eline Rouveirol, editors, Proceedings of ECML edellec and C'98, 10th European Conference on Machine Learning, pages 137-142, Chemnitz, D E, 1998. Springer Verlag, Heidelberg, Del.
[18] Ata Kab'an and Mark Girolami. Fast extraction of semantic features from a latent semantic indexed corpus. Neural Processing Letters, 15(1), 2002.
[19] G. Karypis and E. Sam. Concept indexing: A fast dimensionality reduction algorithm with applications to document retrieval and categorization. Technical Report TR-00-0016, University of Minnesota, Department of Computer Science and Engineering, 2000.
[20] Thomas Kolenda, Lars Kai Hansen, and Sigurdur Sigurdsson. Independent components in text. In M. Girolami, editor, Advances in Independent Component Analysis. Springer-Verlag, 2000.
[21] Daphne Koller and Mehran Sahami. Toward optimal feature selection. In Proceedings of ICML-96, 13th International Conference on Machine Learning, pages 284-292, Bari, Italy, 1996.
[22] J. B. Kruskal. Multidimensional scaling by optimizing goodness of fit to a nonmetric hypothesis. Psychometrika, 29:1-27, 1964.
[23] N. Kumar and A. G. Andreou. Heteroscedastic discriminant analysis and reduced rank HMMs for improved speech recognition. Speech Communication, 26:283-297, 1998.

[24] Huan Liu and Hiroshi Motoda. Feature Selection for Knowledge Discovery and Data Mining. Kluwer Academic Publishers, 1998.

[25] Dunja Mladenic. Feature subset selection in text-learning. In European Conference on Machine Learning, pages 95-100, 1998.

[26] T. Okada and S. Tomita. An optimal orthonormal system for discriminant analysis. Pattern Recognition, 18(2):139-144, 1985.

[27] Christos H. Papadimitriou, Prabhakar Raghavan, Hisao Tamaki, and Santosh Vempala. Latent semantic indexing: A probabilistic analysis. Journal of Computer and System Sciences, 61(2):217-235, 2000.

[28] John W. Sammon Jr. A nonlinear mapping for data structure analysis. IEEE Transactions on Computers, C-18(5):401-409, May 1969.

[29] George Saon and Mukund Padmanabhan. Minimum bayes error feature selection for continuous speech recognition. In Todd K. Leen, Thomas G. Dietterich, and Volker Tresp, editors, Advances in Neural Information Processing Systems 13, pages 800-806. MIT Press, 2001.

[30] Hinrich Schütze, David Hull, and Jan O. Pedersen. A comparison of classifiers and document representations for the routing problem. In Proc. SIGIR'95, 1995.

[31] Kari Torkkola and William Campbell. Mutual information in learning feature transformations. In Proceedings of the 17th International Conference on Machine Learning, pages 1015-1022, Stanford, Calif., USA, Jun. 29-Jul. 2 2000.

[32] H. Yang and J. Moody. Data visualization and feature selection: New algorithms for nongaussian data. In Proceedings NIPS'99, Denver, Colo., USA, Nov. 29-Dec. 2 1999.

[33] Yiming Yang and Jan O. Pedersen. A comparative study on feature selection in text categorization. In Proc. 14th International Conference on Machine Learning, pages 412-420. Morgan Kaufmann, 1997.

Airoldi, E., Blei, D., Fienberg, S., and Xing, E. (2007). Combining stochastic block models and mixed membership for statistical network analysis. In Statistical Network Analysis: Models, Issues and New Directions, Lecture Notes in Computer Science, pages 57-74. Springer-Verlag. In press.

Airoldi, E., Blei, D., S. Fienberg, and E. Xing. Mixed membership stochastic blockmodels. Journal of Machine Learning Research, 9:1981-2014, 2008.

Aitchison, J. (1982). The statistical analysis of compositional data. Journal of the Royal Statistical Society, Series B, 44(2):139-177.

Alzer, H. 2003. Inequalities for the beta function of n variables. ANZIAM Journal 44:609-623.

Amizadeh, Saeed, Milos Hauskrecht: Latent Variable Model for Learning in Pairwise Markov Networks.

Baeza-Yates, R. and Ribeiro-Neto, B. (1999). Modern Information Retrieval. ACM Press, New York.

Barnard, K., P. Duygulu, N. de Freitas, D. Forsyth, Blei, D., and M. Jordan. Matching words and pictures. Journal of Machine Learning Research, 3:1107-1135, 2003.

Basu, Sumit, Danyel Fisher, Steven M. Drucker, Hao Lu: Assisting Users with Clustering Tasks by Combining Metric Learning and Classification.

Beal, M. (2003). Variational algorithms for approximate Bayesian inference. PhD thesis, Gatsby Computational Neuroscience Unit, University College London.

Blei, D. and J. Lafferty. Topic Models. In A. Srivastava and M. Sahami, editors, Text Mining: Theory and Applications. Taylor and Francis, 2009.

Blei, D. and J. Lafferty. Correlated Topic Models. Neural Information Processing Systems, 2006.

Blei, D. and J. Lafferty. Dynamic topic models. In Proceedings of the 23rd International Conference on Machine Learning, 2006.

Blei, D. and Jordan, M. (2003). Modeling annotated data. In Proceedings of the 26th annual International ACM SIGIR Conference on Research and Development in Information Retrieval, pages 127-134. ACM Press.

Blei, D. and Jordan, M. (2005). Variational inference for Dirichlet process mixtures. Journal of Bayesian Analysis, 1(1):121-144.

Blei, D. and L. Kaelbling. Shortest paths in a dynamic uncertain domain. In IJCAI Workshop on Adaptive Spatial Representations of Dynamic Environments, 1999.

Blei, D. and Lafferty, J. (2006). Dynamic topic models. In Proceedings of the 23rd International Conference on Machine Learning, pages 113-120.

Blei, D. and Lafferty, J. (2007). A correlated topic model of Science. Annals of Applied Statistics, 1(1):17-35.

Blei, D. and M. Jordan. Variational inference for Dirichlet process mixtures. Journal of Bayesian Analysis, 1[1]: 121-144, 2006.

Blei, D. and P. Frazier. Distance dependent Chinese restaurant processes. International Conference on Machine Learning, 2010.

Blei, D. and P. Moreno. Topic segmentation with an aspect hidden Markov model. In Proceedings of the 24th annual international ACM SIGIR conference on Research and development in information retrieval, pages 343-348. ACM Press, 2001.

Blei, D. M., A. Y. Ng, and M. I. Jordan, "Latent dirichlet allocation," in Journal of Machine Learning Research, 2003, pp. 993-1022.

Blei, D., A. Ng, and M. Jordan. Hierarchical Bayesian models for applications in information retrieval. In J. Bernardo, J. Berger, A. Dawid, D. Heckerman, A. Smith, and M. West, editors, Bayesian Statistics 7, volume 7, pages 25-44. Oxford University Press, 2003.

Blei, D., J. Bagnell, and A. McCallum. Learning with scope, with application to information extraction and classification. In Uncertainty in Artificial Intelligence: Proceedings of the Eighteenth Conference [UAI-2002], pages 53-60, San Francisco, Calif., 2002. Morgan Kaufmann Publishers.

Blei, D., J. McAuliffe. Supervised topic models. Neural Information Processing Systems 21, 2007.

Blei, D., Probabilistic Models of Text and Images. PhD thesis, U.C. Berkeley, Division of Computer Science, 2004.

Blei, D., T. Griffiths, and M. Jordan. The nested Chinese restaurant process and Bayesian nonparametric inference of topic hierarchies. Journal of the ACM, 57:2 1-30, 2010.

Blei, D., T. Griffiths, M. Jordan, and J. Tenenbaum. Hierarchical topic models and the nested Chinese restaurant process. Neural Information Processing Systems 16, 2003.

Boyd-Graber, J., and Blei, D., Multilingual topic models for unaligned text. Uncertainty in Artificial Intelligence, 2009.

Boyd-Graber, J., and Blei, D., Syntactic topic models. Neural Information Processing Systems, 2008.

Boyd-Graber, J., Blei, D., and X. Zhu. A topic model for word sense disambiguation. In Empirical Methods in Natural Language Processing, 2007.

Buntine, W. and Jakulin, A. (2004). Applying discrete PCA in data analysis. In Proceedings of the 20th Conference on Uncertainty in Artificial Intelligence, pages 59-66. AUAI Press.

Chang, J., and Blei, D., Hierarchical relational models for document networks. Annals of Applied Statistics, 4(1): 124-150, 2010.

Chang, J., and Blei, D., Relational Topic Models for Document Networks. Artificial Intelligence and Statistics, 2009.

Chang, J., J. Boyd-Graber, and Blei, D., Connections between the lines: Augmenting social networks with text. Knowledge Discovery and Data Mining, 2009.

Chang, J., J. Boyd-Graber, S. Gerrish, C. Wang, and Blei, D., Reading tea leaves: How humans interpret topic models. Neural Information Processing Systems, 2009.

Chen, Yuqiang, Ou Jin, Gui-Rong Xue, Jia Chen, Qiang Yang: Visual Contextual Advertising: Bringing Textual Advertisements to Images.

Cohen, S., Blei, D., and N. Smith. Variational inference for adaptor grammars. North American Chapter of the Association for Computational Linguistics, 2010.

Cohn, D. A., and T. Hofmann, "The missing link—a probabilistic model of document content and hypertext connectivity," in NIPS, 2000, pp. 430-436.

Cohn, D., and H. Chang, "Learning to probabilistically identify authoritative documents," in ICML, 2000, pp. 167-174.

de Campos, Cassio Polpo, Qiang Ji: Properties of Bayesian Dirichlet Scores to Learn Bayesian Network Structures.

Deerwester, S., Dumais, S., Landauer, T., Furnas, G., and Harshman, R. (1990). Indexing by latent semantic analysis. Journal of the American Society of Information Science, 41(6):391-407.

Dietz, L., S. Bickel, and T. Scheffer, "Unsupervised prediction of citation influences," in ICML, 2007, pp. 233-240.

Dudik, M., Blei, D., and R. Schapire. Hierarchical maximum entropy density estimation. Proceedings of the 24th International Conference on Machine Learning, 2007.

Erosheva, E., Fienberg, S., and Joutard, C. (2007). Describing disability through individual-level mixture models for multivariate binary data. Annals of Applied Statistics.

Erosheva, E., S. Fienberg, and J. Lafferty, "Mixed membership models of scientific publications," in Proceedings of the National Academy of Sciences, Apr. 6, 2004; 97(22): 11885-11892, 101 Suppl 1:5220-7; Epub 2004 Mar. 12.

Fei-Fei, L. and Perona, P. (2005). A Bayesian hierarchical model for learning natural scene categories. IEEE Computer Vision and Pattern Recognition, pages 524-531.

Fox, Maria, David Poole (Eds.): Proceedings of the Twenty-Fourth AAAI Conference on Artificial Intelligence, AAAI 2010, Atlanta, Ga., USA, Jul. 11-15, 2010. AAAI Press 2010

Fraley, C. and Raftery, A. (2002). Model-based clustering, discriminant analysis, and density estimation. Journal of the American Statistical Association, 97(458):611-631.

Gelman, A., Carlin, J., Stern, H., and Rubin, D. (1995). Bayesian Data Analysis. Chapman & Hall, London.

Gerrish, S., and Blei, D., A language-based approach to measuring scholarly impact. International Conference on Machine Learning, 2010.

Gershman, S., Blei, D., and Y. Niv. Context, Learning and Extinction Psychological Review 117:1 197-209, 2010.

Ghafoor, Arif, Zhang, Zhongfei (Mark), Michael S. Lew, and Zhi-Hua Zhou, Guest Editors' Introduction to Machine Learning Approaches to Multimedia Information Retrieval, ACM Multimedia Systems Journal, Springer, August, 2006, Volume 12, No. 1, pp 1-2

Gilmour, Duane, and Zhang, Zhongfei (Mark), Determining Course of Action Alignment with Operational Objectives, Proc. the 11th International Command and Control Research and Technology Symposium, Cambridge, UK, September, 2006, (accepted)

Griffiths, T. and Steyvers, M. (2004). Finding scientific topics. Proceedings of the National Academy of Science.

Griffiths, T., Steyvers, M., Blei, D., and Tenenbaum, J. (2005). Integrating topics and syntax. In Saul, L. K., Weiss, Y., and Bottou, L., editors, Advances in Neural Information Processing Systems 17, pages 537-544, Cambridge, Mass. MIT Press.

Gu, Weikang, Zhongfei Zhang, and Renjie Jing, Direct Matching among 3D Point-Sets in Scene Analysis, Proc. of IEEE International Conference on Systems, Man, Cybernetics, International Academic Publishers, August, 1988, pp 1038-1041

Guo, Zhen, Shenghuo Zhu, Yun Chi, Zhang, Zhongfei (Mark), and Yihong Gong, A latent topic model for linked documents, Proc. ACM International Conference SIGIR, Boston, Mass., USA, July, 2009

Guo, Zhen, Shenghuo Zhu, Zhang, Zhongfei (Mark), Yun Chi, Yihong Gong, "A Topic Model for Linked Documents and Update Rules for Its Estimation", Proceedings of the Twenty-Fourth AAAI Conference on Artificial Intelligence (AAAI-10), Atlanta Ga., pp. 463-468 (2010)

Guo, Zhen, Zhang, Zhongfei (Mark), Eric P. Xing, and Christos Faloutsos, Semi-supervised learning based on semiparametric regularization, Proc. the SIAM International Conference on Data Mining, Atlanta, Ga., 2008.

Guo, Zhen, Zhang, Zhongfei (Mark), Eric P. Xing, and Christos Faloutsos, Enhanced Max Margin Learning on Multimodal Data Mining in a Multimedia Database, Proc. the 13th ACM SIGKDD International Conference on Knowledge Discovery and Data Mining, San Jose, Calif., USA, August, 2007.

Guo, Zhen, Zhang, Zhongfei (Mark), Eric P. Xing, and Christos Faloutsos, A Max Margin Framework on Image Annotation and Multimodal Image Retrieval, Proc. the IEEE Annual International Conference on Multimedia and Expo, Beijing, China, July, 2007

Guo, Zhen, Zhang, Zhongfei (Mark), Shenghuo Zhu, Yun Chi, Yihong Gong, "Knowledge Discovery from Citation Networks", ICDM '09, Ninth IEEE International Conference on Data Mining, Miami Fla., pp. 800-805 (2009).

Hannah, L., Blei, D., and W. Powell. Dirichlet process mixtures of generalized linear models. Artificial Intelligence and Statistics, 2010.

Hannah, L., W. Powell, and Blei, D., Nonparametric Density Estimation for Stochastic Optimization with an Observable State Variable Neural Information Processing Systems, 2010.

Hoffman, M., Blei, D., and F. Bach. Online Learning for Latent Dirichlet Allocation Neural Information Processing Systems, 2010.

Hoffman, M., Blei, D., and P. Cook. Bayesian nonparametric matrix factorization for recorded music. International Conference on Machine Learning, 2010.

Hoffman, M., Blei, D., and P. Cook. Easy as CBA: A simple probabilistic model for tagging music. International Conference on Music Information Retrieval, 2009.

Hoffman, M., Blei, D., and P. Cook. Content-based musical similarity computation using the hierarchical Dirichlet process. In International Conference on Music Information Retrieval, 2008.

Hoffman, M., Blei, D., P. Cook. Finding Latent Sources in Recorded Music With a Shift-Invariant HDP. International Conference on Digital Audio Effects, 2009.

Hoffman, M., P. Cook, and Blei, D., Bayesian spectral matching: Turning Young MC into MC Hammer via MCMC sampling International Computer Music Conference, 2009.

Hoffman, M., P. Cook, and Blei, D., Data-driven recomposition using the hierarchical Dirichlet process hidden Markov model. In International Computer Music Conference, 2008.

Hofmann, T. (1999). Probabilistic latent semantic indexing. Research and Development in Information Retrieval, in SIGIR, pages 50-57.

Jordan, M., Ghahramani, Z., Jaakkola, T., and Saul, L. (1999). Introduction to variational methods for graphical models. Machine Learning, 37:183-233.

Kalman, R. (1960). A new approach to linear filtering and prediction problems a new approach to linear filtering and prediction problems,". Transaction of the AMSE: Journal of Basic Engineering, 82:35-45.

Kaplan, D., and Blei, D., A computational approach to style in American poetry. In IEEE Conference on Data Mining, 2007.

Kataria, Saurabh, Prasenjit Mitra, Sumit Bhatia: Utilizing Context in Generative Bayesian Models for Linked Corpus.

Lee, D. and Seung, H. (1999). Learning the parts of objects by non-negative matrix factorization. Nature, 401(6755): 788-791.

Lee, D. D., and Seung, H. S. 2000. Algorithms for nonnegative matrix factorization. In NIPS, 556-562.

Li, Fangtao, Minlie Huang, Xiaoyan Zhu: Sentiment Analysis with Global Topics and Local Dependency.

Li, J., C. Wang, Y. Lim, Blei, D., and L. Fei-Fei. Building and using a semantivisual image hierarchy. Computer Vision and Pattern Recognition, 2010.

Li, Ming, Zhang, Zhongfei (Mark), and Zhi-Hua Zhou, Mining Bulletin Board Systems Using Community Generation, Proc. Pacific and Asia Knowledge Discovery and Data Mining Conference, Osaka, Japan, May 2008.

Li, Pei-Pei, Xindong Wu, Xuegang Hu: Learning from Concept Drifting Data Streams with Unlabeled Data.

Li, W., Blei, D., and A. McCallum. Nonparametric Bayes pachinko allocation. In The 23rd Conference on Uncertainty in Artificial Intelligence, 2007.

Li, Xi, Weiming Hu, and Zhang, Zhongfei (Mark), Corner Detection of Contour Images Using Spectral Clustering, Proc. the 14th IEEE International Conference on Image Processing, San Antonio, Tex., USA, September, 2007

Li, Xi, Weiming Hu, Zhang, Zhongfei (Mark), and Yang Liu, Spectral Graph Partitioning Based on A Random Walk Diffusion Similarity Measure, Proc. Asian Conference on Computer Vision, XiAn, China, September, 2009

Li, Xi, Weiming Hu, Zhang, Zhongfei (Mark), Xiaoqin Zhang, and Quan Luo, Robust Visual Tracking Based on Incremental Tensor Subspace Learning, Proc. the IEEE International Conference on Computer Vision, Rio de Janeiro, Brazil, October, 2007

Li, Xi, Weiming Hu, Zhongfei Zhang, and Xiaoqin Zhang, Robust Visual Tracking Based on An Effective Appearance Model, Proc. European Computer Vision Conference, Marseille, France, October, 2008

Li, Xi, Weiming Hu, Zhongfei Zhang, Xiaoqin Zhang, and Guan Luo, Trajectory-Based Video Retrieval Using Dirichlet Process Mixture Models, Proc. British Machine Vision Conference, Leeds, UK, September, 2008

Li, Xi, Weiming Hu, Zhongfei Zhang, Xiaoqin Zhang, Mingliang Zhu, Jian Cheng, and Guan Luo, Visual tracking via incremental log-Euclidean Riemannian subspace learning, Proc. IEEE Computer vision and Pattern Recognition, Anchorage, Ak., USA, June 2008.

Li, Xi, Weiming Hu, Zhongfei Zhang, Xiaoqin Zhang, Robust Foreground Segmentation Based on Two Effective Background Models, Proc. ACM International Conference on Multimedia Information and Retrieval, Vancouver, Canada, October, 2008

Li, Xi, Zhongfei Zhang, Yanguo Wang, and Weiming Hu, Multiclass Spectral Clustering Based on Discriminant Analysis, Proc. International Conference on Pattern Recognition, Tempa, Fla., USA, December, 2008

Long, Bo, Philip S. Yu and Zhang, Zhongfei (Mark), A general model for multiple view unsupervised learning, Proc. the SIAM International Conference on Data Mining, Atlanta, Ga., 2008.

Long, Bo, Xiaoyun Wu, Zhang, Zhongfei (Mark), and Philip S. Yu, Community Learning by Graph Approximation, Proc. the IEEE International Conference on Data Mining, Omaha, Nebr., USA, October, 2007.

Long, Bo, Xiaoyun Wu, Zhang, Zhongfei (Mark), and Philip S. Yu, Unsupervised Learning on K-partite Graphs, Proc. ACM International Conference on Knowledge Discovery and Data Mining, ACM Press, Philadelphia, Pa., USA, August, 2006

Long, Bo, Zhang, Zhongfei (Mark), and Philip S. Yu, A General Framework for Relation Graph Clustering, Knowledge and Information Systems Journal, Elsevier Science Press, Accepted, 2009

Long, Bo, Zhang, Zhongfei (Mark), and Philip S. Yu, A Probabilistic Framework for Relational Clustering, Proc. the 13th ACM International Conference on Knowledge Discovery and Data Mining, San Jose, Calif., USA, August, 2007

Long, Bo, Zhang, Zhongfei (Mark), and Philip S. Yu, Co-clustering by Block Value Decomposition, Proc. ACM International Conference on Knowledge Discovery and Data Mining, ACM Press, Chicago, Ill., August, 2005

Long, Bo, Zhang, Zhongfei (Mark), and Philip S. Yu, Combining Multiple Clusterings by Soft Correspondence, Proc. IEEE International Conference on Data Mining, IEEE Computer Society Press, New Orleans, La., November, 2005

Long, Bo, Zhang, Zhongfei (Mark), and Philip S. Yu, Graph Partitioning Based on Link Distribution, Proc. the 22nd Annual Conference on Artificial Intelligence (AAAI-07), Vancouver, British Columbia, Canada, July, 2007

Long, Bo, Zhang, Zhongfei (Mark), and Philip S. Yu, Relational Clustering by Symmetric Convex Coding, Proc. the 24th Annual International Conference on Machine Learning, Oregon State University, OR, USA, June, 2007

Long, Bo, Zhang, Zhongfei (Mark), and Tianbing Xu, Clustering on Complex Graphs, Proc. 23th Conference on Artificial Intelligence (AAAI 2008), Chicago, Ill., USA, July, 2008.

Long, Bo, Zhang, Zhongfei (Mark), Xiaoyun Wu, and Philip S. Yu, A General Model for Relational Clustering, Proc. International Workshop on Open Problems in Statistical Relational Learning, ACM Press, Pittsburgh, Pa., USA, June, 2006

Long, Bo, Zhang, Zhongfei (Mark), Xiaoyun Wu, and Philip S. Yu, Spectral Clustering for Multi-Type Relational Data, Proc. International Conference on Machine Learning, ACM Press, Pittsburgh, Pa., USA, June, 2006

Long, Bo, Zhang, Zhongfei (Mark), and Philip S. Yu, Relational Data Clustering: Models, Algorithms, and Applications, Taylor & Francis/CRC Press, 2009, ISBN: 9781420072617

Lorbert, A., D. Eis, V. Kostina, Blei, D., and P. Ramadge. Exploiting covariate similarity in sparse regression via the pairwise elastic net. Artificial Intelligence and Statistics, 2010.

Lovasz, L., and Plummer, M. D. 1986. Matching Theory (North-Holland mathematics studies). Elsevier Science Ltd.

Mau, B., Newton, M., and Larget, B. (1999). Bayesian phylogenies via Markov Chain Monte Carlo methods. Biometrics, 55:1-12.

McAuliffe, J., Blei, D., and M. Jordan. Nonparametric empirical Bayes for the Dirichlet process mixture model. Statistics and Computing, 16[1]: 5-14, 2006. [Springer]

McCallum, A, K. Nigam, J. Rennie, and K. Seymore, "Automating the construction of internet portals with machine learning," Inf. Retr., vol. 3, no. 2, pp. 127-163, 2000.

McLachlan, G. and Peel, D. (2000). Finite mixture models. Wiley-Interscience.

Minka, T., and Lafferty, J. 2002. Expectation-propagation for the generative aspect model. In Proceedings of the 18th Conference on Uncertainty in Artificial Intelligence, 352-359. Morgan Kaufmann.

Mukherjee, I., and Blei, D., Relative performance guarantees for approximate inference in latent Dirichlet allocation. Neural Information Processing Systems, 2008.

Nallapati, R., A. Ahmed, E. P. Xing, and W. W. Cohen, "Joint latent topic models for text and citations," in KDD, 2008, pp. 542-550.

Nigam, K., McCallum, A., Thrun, S., and Mitchell, T. (2000). Text classification from labeled and unlabeled documents using EM. Machine Learning, 39(2/3):103-134.

Paul, Michael, Roxana Girju: A Two-Dimensional Topic-Aspect Model for Discovering Multi-Faceted Topics.

Ping, Wei, Ye Xu, Kexin Ren, Chi-Hung Chi, Shen Furao: Non-I.I.D. Multi-Instance Dimensionality Reduction by Learning a Maximum Bag Margin Subspace.

Pintilie, Stefan, Ali Ghodsi: Conformal Mapping by Computationally Efficient Methods.

Porteous, Ian, Arthur Asuncion, Max Welling: Bayesian Matrix Factorization with Side Information and Dirichlet Process Mixtures.

Pritchard, J., Stephens, M., and Donnelly, P. (2000). Inference of population structure using multilocus genotype data. Genetics, 155:945-959.

Purver, M., K"ording, K., Griffiths, T., and Tenenbaum, J. (2006). Unsupervised topic modelling for multi-party spoken discourse. In ACL.

Qian, Buyue, Ian Davidson: Semi-Supervised Dimension Reduction for Multi-Label Classification.

Rabiner, L. R. (1989). A tutorial on hidden Markov models and selected applications in speech recognition. Proceedings of the IEEE, 77:257-286.

Rao, Aibing, Rohini K. Srihari, and Zhongfei Zhang, Geometric Histogram: A Distribution of Geometric Configurations of Color Subsets, Proc. of SPIE, Volume 3964, Internet Imaging, SPIE Press, San Jose, Calif., Jan. 26-28, 2000, pp 91-101.

Rao, Aibing, Rohini K. Srihari, and Zhongfei Zhang, Spatial Color Histograms for Content-Based Image Retrieval, Proc. IEEE Computer Society Eleventh Conference on Tools with Artificial Intelligence, IEEE Computer Society Press, Chicago, Ill., Nov. 9-11, 1999, pp 183-186.

Rosen-Zvi, M., Griffiths, T., Steyvers, M., and Smith, P. (2004). The author-topic model for authors and documents. In Proceedings of the 20th Conference on Uncertainty in Artificial Intelligence, pages 487-494. AUAI Press.

Russell, B., Efros, A., Sivic, J., Freeman, W., and Zisserman, A. (2006). Using multiple segmentations to discover objects and their extent in image collections. In IEEE Conference on Computer Vision and Pattern Recognition, pages 1605-1614.

Shaparenko, B, and T. Joachims, "Information genealogy: uncovering the flow of ideas in non-hyperlinked document databases," in KDD, 2007, pp. 619-628.

Shen, Bin, Luo Si: Non-Negative Matrix Factorization Clustering on Multiple Manifolds.

Shen, Bing, Zhang, Zhongfei (Mark), and Chunfa Yuan, Person name identification in Chinese documents using finite state automata, IEEE Intl Conf. on Intelligent Agent Technology, Halifax, Canada, October, 2003

Shi, J., and Malik, J. 2000. Normalized cuts and image segmentation. IEEE Trans. Pattern Anal. Mach. Intell. 22(8):888-905.

Socher, R., S. Gershman, A. Perotte, P. Sederberg, Blei, D., and K. Norman. A Bayesian analysis of dynamics in free recall. Neural Information Processing Systems, 2009.

Song, Yangqiu, Shimei Pan, Shixia Liu, Furu Wei, Michelle X. Zhou, Weihong Qian: Constrained Coclustering for Textual Documents.

Srihari, Rohini K., and Zhongfei Zhang, Combining Text and Image Context in Data Mining for the WWW, Proc. IEEE Conference on Dual Use of Technology and Applications, IEEE Press, May, 1997, pp 112-116

Srihari, Rohini K., and Zhongfei Zhang, Exploiting Multimodal Context in Image Retrieval, Library Trends, Special Issue on Progress in Visual Information Retrieval, the University of Illinois Press, Vol. 48, Fall, 1999, pp 496-520

Srihari, Rohini K., and Zhongfei Zhang, Finding Pictures In Context, Proc. of IAPR International Workshop on Multimedia Information Analysis & Retrieval, Springer-Verlag Press, Hong Kong, August, 1998, pp 109-123

Srihari, Rohini K., and Zhongfei Zhang, Show&Tell: A Multimedia System for Semi-Automated Image Annotation, IEEE Multimedia, IEEE Computer Society Press, Vol. 7, No. 3, July-September, 2000, pp 61-71

Srihari, Rohini K., Zhongfei Zhang, and Aibing Rao, Image Background Search: Combining Object Detection Techniques into Content-Based Similarity Image Retrieval [CBSIR] Systems, Proc. of IEEE International Workshop on Content-Based Access of Image and Video Libraries, IEEE Press, Fort Collins, Colo., USA, June, 1999, pp 97-101.

Srihari, Rohini K., Zhongfei Zhang, and Aibing Rao, Intelligent Indexing and Semantic Retrieval of Multimodal Documents, International Journal of Information Retrieval, special issue on Document Analysis, Kluwer Academic Publishers, Vol. 2, No. 2/3, May, 2000, pp 245-275

Srihari, Rohini K., Zhongfei Zhang, and Rajiv Chopra, Using Speech Input for Image Interpretation and Annotation, Proc. AAAI Spring Symposium, Stanford University, CA, March, 1997, pp 17-24.

Srihari, Rohini K., Zhongfei Zhang, Mahesh Venkatraman, and Rajiv Chopra, Using Speech Input for Image Interpretation and Annotation, Proc. Image Understanding Workshop, Morgan Kaufmann Publishers, Inc., February, 1996, pp 501-510

Steyvers, M. and Griffiths, T. (2006). Probabilistic topic models. In Landauer, T., McNamara, D., Dennis, S., and Kintsch, W., editors, Latent Semantic Analysis: A Road to Meaning. Laurence Erlbaum.

Stoilos, Giorgos, Bernardo Cuenca Grau, Ian Horrocks: How Incomplete Is Your Semantic Web Reasoner?

Straccia, Umberto, Nuno Lopes, Gergely Lukacsy, Axel Polleres: A General Framework for Representing and Reasoning with Annotated Semantic Web Data.

Sun, Yu-Yin, Michael K. Ng, Zhi-Hua Zhou: Multi-Instance Dimensionality Reduction.

Sun, Yu-Yin, Yin Zhang, Zhi-Hua Zhou: Multi-Label Learning with Weak Label.

Tang, Z. and MacLennan, J. (2005). Data Mining with SQL Server 2005. Wiley.

Teh, Y., M. Jordan, M. Beal, and Blei, D., Hierarchical Dirichlet processes. Journal of the American Statistical Association, 2006. 101[476]: 1566-1581.

Teh, Y., Newman, D., and Welling, M. (2006). A collapsed variational Bayesian inference algorithm for latent Dirichlet allocation. In Neural Information Processing Systems.

Wainwright, M. and Jordan, M. (2005). A variational principle for graphical models. In New Directions in Statistical Signal Processing, chapter 11. MIT Press.

Wang, C., and Blei, D., Decoupling sparsity and smoothness in the discrete hierarchical Dirichlet process. Neural Information Processing Systems, 2009.

Wang, C., and Blei, D., Variational inference for the nested Chinese restaurant process. Neural Information Processing Systems, 2009.

Wang, C., B. Thiesson, C. Meek, and Blei, D., Markov topic models. Artificial Intelligence and Statistics, 2009.

Wang, C., Blei, D., and D. Heckerman. Continuous time dynamic topic models. In Uncertainty in Artificial Intelligence [UAI], 2008.

Wang, C., Blei, D., and L. Fei-Fei. Simultaneous image classification and annotation. Computer Vision and Pattern Recognition, 2009.

Wei, X. and Croft, B. (2006). LDA-based document models for ad-hoc retrieval. In SIGIR.

West, M. and Harrison, J. (1997). Bayesian Forecasting and Dynamic Models. Springer.

Williamson, S., C. Wang, K. Heller, and Blei, D., The IBP compound Dirichlet process and its application to focused topic modeling. International Conference on Machine Learning, 2010.

Winn, J. and Bishop, C. (2005). Variational message passing. Journal of Machine Learning Research, 6:661-694.

Witten, I. H., and Frank, E. 2005. Data Mining: Practical Machine Learning Tools and Techniques. Morgan Kaufmann.

Wu, Hao, Jiajun Bu, Chun Chen, Can Wang, Guang Qiu, Lijun Zhang, Jianfeng Shen: Modeling Dynamic Multi-Topic Discussions in Online Forums. www.cs.binghamton.edu/~zguo/icdm09.

Xing, E., Jordan, M., and Russell, S. (2003). A generalized mean field algorithm for variational inference in exponential families. In Proceedings of the 19th Conference on Uncertainty in Artificial Intelligence.

Xu, Tianbing, Zhongfei Zhang, Philip S. Yu, and Bo Long, Dirichlet Process Based Evolutionary Clustering, Proc. IEEE International Conference on Data Mining, Pisa, Italy, December, 2008

Xu, Tianbing, Zhongfei Zhang, Philip S. Yu, and Bo Long, Evolutionary Clustering by Hierarchical Dirichlet Process with Hidden Markov State, Proc. IEEE International Conference on Data Mining, Pisa, Italy, December, 2008

Xu, W.; Liu, X.; and Gong, Y. 2003. Document clustering based on non-negative matrix factorization. In SIGIR, 267-273.

Xue, Xiao-Bing, Zhi-Hua Zhou, and Zhang, Zhongfei (Mark), Improve Web Search Using Image Snippets, Proc. the 21st National Conference on Artificial Intelligence, AAAI Press, Boston, Mass., USA, July, 2006

Xue, Xiao-Bing, Zhi-Hua Zhou, and Zhang, Zhongfei (Mark), Improving Web Search Using Image Snippets, ACM Transactions on Internet Technology, ACM Press, in press, 2008

Yao, Jian, and Zhang, Zhongfei (Mark), Hierarchical Shadow Detection for Color Aerial Images, Computer Vision and Image Understanding, Elsevier Science, Volume 102, Issue 1, April, 2006, pp 60-69

Yao, Jian, and Zhang, Zhongfei (Mark), Object Detection in Aerial Imagery Based on Enhanced Semi-Supervised Learning, Proc. IEEE International Conference on Computer Vision, IEEE Computer Society Press, Beijing, China, October, 2005

Yao, Jian, and Zhang, Zhongfei (Mark), Semi-Supervised Learning Based Object Detection in Aerial Imagery, proceedings of the 2005 IEEE International Conference on Computer Vision and Pattern Recognition (CVPR), San Diego, Calif., June, 2005.

Yao, Jian, and Zhang, Zhongfei (Mark), Systematic Static Shadow Detection, proceedings of the 17th International Conference on Pattern Recognition (ICPR), Cambridge, UK, August, 2004.

Yao, Jian, Sameer Antani, Rodney Long, and George Thoma, and Zhang, Zhongfei (Mark), Automatic Medical Image Annotation and Retrieval Using SECC, Proc. IEEE International Symposium on Computer Based Medical Systems, IEEE Computer Society Press, Salt Lake City, Utah, USA, June, 2006

Yao, Jian, Zhang, Zhongfei (Mark), Sameer Antani, Rodney Long, and George Thoma, Automatic Medical Image Annotation and Retrieval, Neurocomputing, Elsevier Science Press, Volume 71/10-12, 2008, pp 2012-2022

Yao, Jian, Zhang, Zhongfei (Mark), Sameer Antani, Rodney Long, and George Thoma, Automatic Medical Image Annotation and Retrieval Using SEMI-SECC, Proc. IEEE International Conference on Multimedia and Expo, IEEE Computer Society Press, Toronto, Canada, July, 2006

Yuan, Zejian, Nanning Zheng, Yuanlin Zhang and Guo, Zhen, A Design Method for Nonlinear Diffusion Filter and Its Application, The Chinese Journal of Computers, vol. 10, 2002

Zhang, Changqing, Weiyi Meng, Zhongfei Zhang, Zonghuan Wu, WebSSQL-A Query Language for Multimedia Web Documents, accepted in Proceedings of Advanced Digital Libraries, Washington, D.C., May, 2000

Zhang, Heng, Mingsheng Ying: Decidable Fragments of First-Order Language Under Stable Model Semantics and Circumscription.

Zhang, Ruofei, and Zhang, Zhongfei (Mark), A Clustering Based Approach to Efficient Image Retrieval, Proc. IEEE International Conference on Tools with Artificial Intelligence, IEEE Computer Society Press, Washington D.C., USA, November, 2002

Zhang, Ruofei, and Zhang, Zhongfei (Mark), Effective Image Retrieval Based on Hidden Concept Discovery in Image Database, IEEE Transaction on Image Processing, Volume 16, Number 2, February, 2007, pp 562-572

Zhang, Ruofei, and Zhang, Zhongfei (Mark), Empirical Bayesian Learning in the Relevance Feedback of Image Retrieval, Image and Vision Computing, Elsevier Science, Volume 24, Issue 3, March, 2006, pp 211-223

Zhang, Ruofei, and Zhang, Zhongfei (Mark), FAST: Towards More Effective and Efficient Image Retrieval, Accepted to appear in ACM Transactions on Multimedia Systems, the special issue on Multimedia Information Retrieval, Springer, 2005

Zhang, Ruofei, and Zhang, Zhongfei (Mark), Image Database Classification based on Concept Vector Model, proceedings of the 2005 IEEE International Conference on Multimedia and Expo (ICME), Amsterdam, The Netherlands, July, 2005.

Zhang, Ruofei, and Zhang, Zhongfei (Mark), Solving Small and Asymmetric Sampling Problem in the Context of Image Retrieval, in Artificial Intelligence for Maximizing Content Based Image Retrieval, Edited by Zongmin Ma, Idea Group Inc., 2008

Zhang, Ruofei, and Zhongfei (Mark) Zhang, Towards an Efficient and Effective Image Retrieval Engine (to appear), ACM Multimedia Systems Journal, accepted January 2005.

Zhang, Ruofei, and Zhongfei (Mark) Zhang, A Robust Color Object Analysis Approach to Efficient Image Retrieval, EURASIP Journal on Applied Signal Processing, Vol. 2004, No. 6, 2004.

Zhang, Ruofei, and Zhongfei (Mark) Zhang, Addressing CBIR Efficiency, Effectiveness, and Retrieval Subjectivity Simultaneously, proceedings of the 5th ACM SIGMM Intl Workshop on Multimedia Information Retrieval (MIR), in conjunction with ACM Multimedia (ACM MM) 2003, Berkeley, Calif., November, 2003 (Oral presentation)

Zhang, Ruofei, and Zhongfei (Mark) Zhang, Hidden Semantic Concepts Discovery in Region Based Image Retrieval, proceedings of the 2004 IEEE International Conference on Computer Vision and Pattern Recognition (CVPR), Washington, D.C., June, 2004.

Zhang, Ruofei, and Zhongfei (Mark) Zhang, Stretching Bayesian Learning in the Relevance Feedback of Image Retrieval, proceedings of the 8th European Conference on Computer Vision (ECCV), Prague, Czech Republic, May, 2004

Zhang, Ruofei, Ramesh Sarukkai, Jyh-Herny Chow, Wei Dai, Zhang, Zhongfei (Mark), Joint Categorization of Queries and Clips for Web-based Video Search, Proc. International Workshop on Multimedia Information Retrieval, ACM Press, Santa Barbara, Calif., USA, November, 2006

Zhang, Ruofei, Sandeep Khanzode, and Zhang, Zhongfei (Mark), Region Based Alpha-Semantics Graph Driven Image Retrieval, proceedings of the 17th International Conference on Pattern Recognition (ICPR), Cambridge, UK, August, 2004. (Oral presentation)

Zhang, Ruofei, Zhang, Zhongfei (Mark), and Sandeep Khanzode, A Data Mining Approach to Modeling Relationships Among Categories in Image Collection, proceedings of the 10th ACM International Conference on Knowledge Discovery and Data Mining (ACM KDD), Seattle, Wash., August 2004.

Zhang, Ruofei, Zhang, Zhongfei (Mark), Mingjing Li, Wei-Ying Ma, and Hong-Jiang Zhang, A Probabilistic Semantic Model for Image Annotation and Multi-Modal Image Retrieval, ACM Multimedia Systems Journal, the special issue of Using Machine Learning Approaches to Multimedia Information Retrieval, Springer, August, 2006, Volume 12, No. 1, pp 27-33

Zhang, Ruofei, Zhang, Zhongfei (Mark), Mingjing Li, Wei-Ying Ma, and Hong-Jiang Zhang, A Probabilistic Semantic Model for Image Annotation and Multi-Modal Image Retrieval, proceedings of the 2005 IEEE International Conference on Computer Vision (ICCV'05), Beijing, China, October, 2005.

Zhang, Ruofei, Zhongfei (Mark) Zhang and Zhongyuan Qin, Semantic Repository Modeling in Image Database, proceedings of the 2004 IEEE International Conference on Multimedia and Expo (ICME), Taipei, Taiwan, June, 2004.

Zhang, Zhongfei (Mark), Andrzej Krol, Guangbiao Pu, IBMAS: An Internet-Based Medical Archive System, Proc. The 14th IEEE Symposium on Computer-Based Medical Systems, IEEE Computer Society Press, Bethesda, Md., USA, July, 2001, pp 541-546

Zhang, Zhongfei (Mark), Bo Long, Guo, Zhen, Tianbing Xu, and Philip S. Yu, Machine Learning Approaches to Link-Based Clustering, in Link Mining: Models, Algorithms and Applications, Edited by Philip S. Yu, Christos Faloutsos, and Jiawei Han, Springer, 2009 Guo, Zhen, Zhang, Zhongfei (Mark), Eric P. Xing, and Christos Faloutsos, A Max Margin Framework on Image Annotation and Multimodal Image Retrieval, in Multimedia, Edited by Vedran Kordic, IN-TECH, 2009

Zhang, Zhongfei (Mark), Florent Masseglia, Ramesh Jain, and Alberto Del Bimbo, Editorial: Introduction to the Special Issue on Multimedia Data Mining, IEEE Transactions on Multimedia, IEEE Computer Society Press, Volume 10, Number 2, 2008, pp 165-166.

Zhang, Zhongfei (Mark), Florent Masseglia, Ramesh Jain, and Alberto Del Bimbo, KDD/MDM 2006: The 7th KDD Multimedia Data Mining Workshop Report, ACM KDD Explorations, ACM Publishers, Volume 8, Issue 2, December, 2006, pp 92-95.

Cloud computing architectures are known. See the following, each of which is expressly incorporated herein by reference in its entirety: 20110265168; 20110265164; 20110265147; 20110265087; 20110265081; 20110265077; 20110264910; 20110264907; 20110264754; 20110264494; 20110264490; 20110264418; 20110261401; 20110258692; 20110258686; 20110258630; 20110258621; 20110258612; 20110258575; 20110258481; 20110258441; 20110258338; 20110258305; 20110258263; 20110258261; 20110258234; 20110258202; 20110258179; 20110258178; 20110258154; 20110258111; 20110257991; 20110257977; 20110252420; 20110252407; 20110252192; 20110252186; 20110252181; 20110252071; 20110252067; 20110251992; 20110251937; 20110251902; 20110251878; 20110250570; 20110247074; 20110247045; 20110246995; 20110246992; 20110246913; 20110246817; 20110246815; 20110246767; 20110246766; 20110246765; 20110246653; 20110246627; 20110246575; 20110246550; 20110246530; 20110246518; 20110246480; 20110246434; 20110246433; 20110246326; 20110246310; 20110246298; 20110246297; 20110246294; 20110246284; 20110246261; 20110246253; 20110246068; 20110244961; and 20110244440.

What is claimed is:

1. A method for managing optically character recognized documents, comprising:

analyzing semantic information content of a series of untagged pages, with at least one automated processor, based on at least a correspondence of the semantic content of respective document portions of the series of untagged pages to a plurality of statistical semantic classification features, to generate:
  a document structure of the semantic information content of the series of untagged pages, comprising a series of respective document portions, and a status for respective document portions; and
  for each respective document portion, at least one of a document classification of the respective document portion, and an exception to valid document classification of the respective document portion;
receiving, from a user, a manual classification of respective document portions having the exception to valid document classification; and
updating the plurality of statistical semantic classification features based on the received manual classifications and the semantic content of the respective document portions.

2. The method according to claim 1, wherein the analyzing of the semantic information content of a series of untagged pages comprises performing a principal component analysis.

3. The method according to claim 1, wherein the analyzing of the semantic information content of a series of untagged pages comprises latent semantic indexing.

4. The method according to claim 1, wherein the analyzing of the semantic information content of a series of untagged pages comprises performing independent component analysis.

5. The method according to claim 1, wherein the analyzing of the semantic information content of a series of untagged pages comprises mapping data points into a lower dimensional space optimized to preserve mutual distances in an original high-dimensional semantic space.

6. The method according to claim 1, wherein the analyzing of the semantic information content of a series of untagged pages comprises performing a linear discriminant analysis.

7. The method according to claim 1, wherein the analyzing of the semantic information content of a series of untagged pages comprises determining a Mahalanobis distance.

8. The method according to claim 1, wherein the document structure comprises a set of field within a form template.

9. The method according to claim 1, wherein the document structure is coded in an ordered manner, further comprising comparing the ordered codes to ordered codes of other documents.

10. The method according to claim 1, wherein said analyzing performs a document classification algorithm based on a string comprising a plurality of words.

11. The method according to claim 10, wherein the document classification comprises a signature analysis.

12. The method according to claim 1, further comprising indexing semantic content of a plurality of documents.

13. The method according to claim 12, further comprising performing at least one database storage retrieval operation based on at least the semantic content index.

14. The method according to claim 12, further comprising determining a provenance of a respective document, storing the determined provenance in database record associated with a document database record.

15. The method according to claim 1, further comprising automatically performing at least one task selectively dependent on document classification of a respective document portion, after said analyzing.

16. The method according to claim 1, further comprising reprocessing a document having a document portion having a document classification according to the updated plurality of statistical semantic classification features, and replacing the document classification with an updated document classification.

17. A system for managing optically character recognized documents, comprising:
  a database, configured to store semantic information content of untagged pages, classifications of the semantic information content, and an index of the semantic information content;
  at least one input configured to receive a manual classification of document portions of the untagged pages having an exception to valid document classification; and
  at least one automated processor, configured to analyze semantic information content of the untagged pages, based on at least a correspondence of the respective document portion to a plurality of statistical semantic classification features, to generate:
    a document structure of the semantic information content of the untagged pages, comprising a series of respective document portions, and a status for respective document portions; and
    for each document portion, at least one of a document classification of the respective document portion, and an exception to valid document classification of the respective document portion; and
  update the plurality of statistical semantic classification features based on the received manual classification and the semantic content of the respective document portions for document portions having an exception to valid document classification.

18. The system according to claim 17, further comprising an optical character recognition engine to produce the semantic information content from a series of page images representing the plurality of documents.

19. The system according to claim 17, wherein the database is configured to selectively access the records based on at least a query and the index of semantic content.

20. A method for managing documents, comprising:
  performing optical character recognition on at least one optical image of a document, to produce an untagged page of semantic information content;
  analyzing the semantic information content, with at least one automated processor, based on at least a correspondence of the semantic information content of respective document portions of the document to a plurality of statistical semantic classification features, to generate:
    a document structure of the document, comprising a plurality of respective document portions, and a status for respective document portions; and
    for each document portion, at least one of a classification of the respective document portion, and an exception to valid classification of the respective document portion;
  receiving, from a user, a manual classification of a respective portion having the exception to valid document classification; and
  updating the plurality of statistical semantic classification features based on the received manual classification and the semantic content of the respective document portion.

* * * * *